(12) United States Patent
Tominaga

(10) Patent No.: US 12,105,389 B1
(45) Date of Patent: Oct. 1, 2024

(54) DISPLAY PANEL

(71) Applicant: Sharp Display Technology Corporation, Kameyama (JP)

(72) Inventor: Masakatsu Tominaga, Kameyama (JP)

(73) Assignee: Sharp Display Technology Corporation, Kameyama (JP)

(*) Notice: Subject to any disclaimer, the term of this patent is extended or adjusted under 35 U.S.C. 154(b) by 0 days.

(21) Appl. No.: 18/594,182

(22) Filed: Mar. 4, 2024

(30) Foreign Application Priority Data

Apr. 14, 2023 (JP) ................. 2023-066510

(51) Int. Cl.
 *G02F 1/1362* (2006.01)
 *G02F 1/1343* (2006.01)
 *G02F 1/1368* (2006.01)
 *G09G 3/36* (2006.01)

(52) U.S. Cl.
 CPC .... *G02F 1/136286* (2013.01); *G02F 1/13624* (2013.01); *G02F 1/1368* (2013.01); *G09G 3/3677* (2013.01); *G02F 1/134372* (2021.01); *G09G 2320/0257* (2013.01)

(58) Field of Classification Search
 CPC ............ G02F 1/1333; G02F 1/133345; G02F 1/1335; G02F 1/133528; G02F 1/133512; G02F 1/133514; G02F 1/1343; G02F 1/134309; G02F 1/134363; G02F 1/134372; G02F 1/1362; G02F 1/136209; G02F 1/136227; G02F 1/13624; G02F 1/136286; G02F 1/1368; G09G 3/3677; G09G 2320/0257
 See application file for complete search history.

(56) References Cited

U.S. PATENT DOCUMENTS

| | | |
|---|---|---|
| 2002/0047818 A1 | 4/2002 | Yamamoto et al. |
| 2004/0207649 A1 | 10/2004 | Shih |
| 2005/0253826 A1 | 11/2005 | Yang |
| 2008/0198110 A1 | 8/2008 | Sasaki |
| 2012/0112200 A1 | 5/2012 | Nagano |

(Continued)

FOREIGN PATENT DOCUMENTS

| | | |
|---|---|---|
| JP | H09127917 A | 5/1997 |
| JP | 2001-042282 A | 2/2001 |

(Continued)

*Primary Examiner* — Thoi V Duong
(74) *Attorney, Agent, or Firm* — ScienBiziP, P.C.

(57) ABSTRACT

A display panel including: a plurality of pixels arranged in a longitudinal direction and a lateral direction; a plurality of pixel electrodes; a common electrode; a first, second, third, and fourth gate lines extending in the lateral direction; and a first and second data lines, and a common line extending in the longitudinal direction, in which the plurality of pixels include a first pixel having a first pixel electrode and a second pixel adjacent to the first pixel in the lateral direction and having a second pixel electrode, the third gate line is arranged to overlap the first and the second pixel electrodes, the common line is arranged between the first and the second pixel electrodes, and the display panel further includes a first switching element connected to the first pixel electrode, the common line, and the third gate line, and a second switching element connected to the second pixel electrode, the common line, and the third gate line.

18 Claims, 16 Drawing Sheets

(56) References Cited

U.S. PATENT DOCUMENTS

2014/0104150 A1\* 4/2014 Nagashima ......... H01L 27/1222
　　　　　　　　　　　　　　　　　　　　　345/92
2015/0109282 A1 　4/2015 Chen et al.

FOREIGN PATENT DOCUMENTS

| JP | 2001-331156 A | 11/2001 |
|----|---------------|---------|
| JP | 2003-108087 A | 4/2003 |
| JP | 2004-318072 A | 11/2004 |
| JP | 2005-326809 A | 11/2005 |
| JP | 2008-203627 A | 9/2008 |
| JP | 2012-103343 A | 5/2012 |
| JP | 2016-532160 A | 10/2016 |

\* cited by examiner

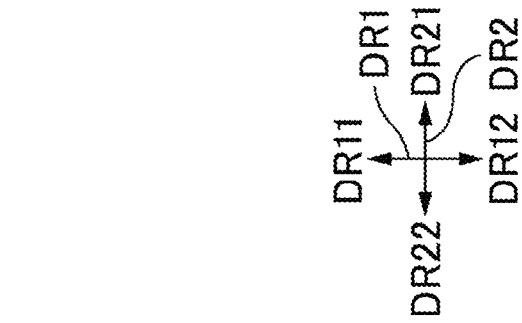
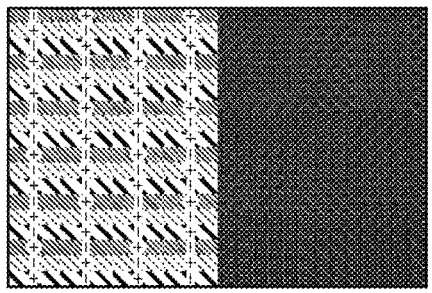
FIG. 10E
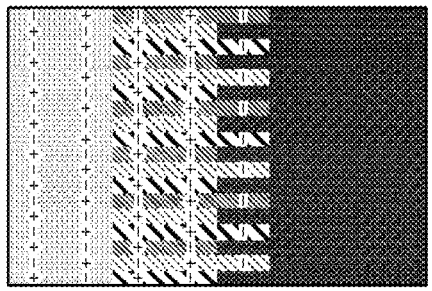
FIG. 10D
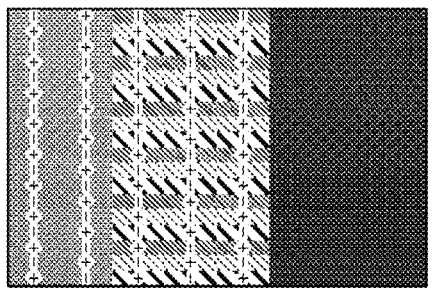
FIG. 10C
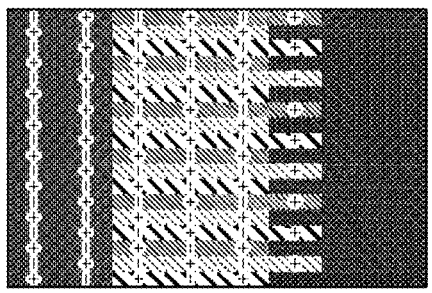
FIG. 10B
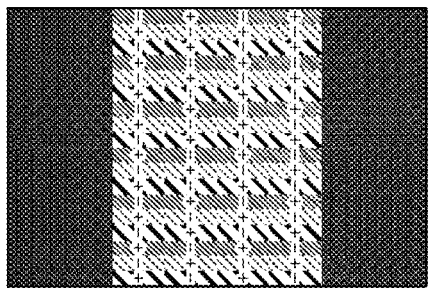
FIG. 10A
FIG. 10I
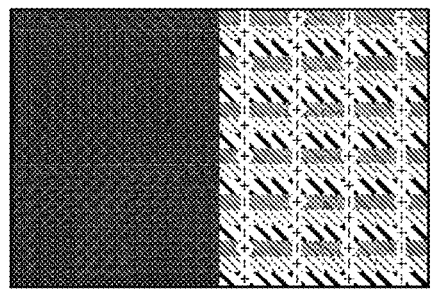
FIG. 10H
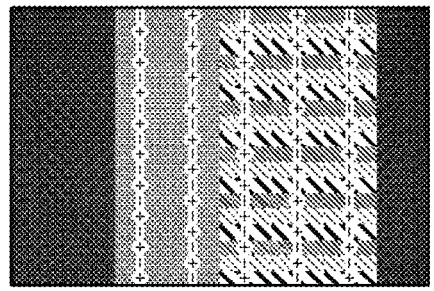
FIG. 10G
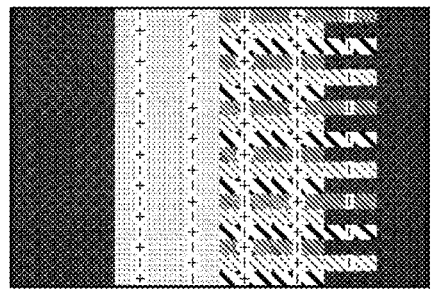
FIG. 10F

DISPLAY PANEL

CROSS-REFERENCE TO RELATED APPLICATIONS

This application claims the benefit of priority to Japanese Patent Application Number 2023-066510 filed on Apr. 14, 2023. The entire contents of the above-identified application are hereby incorporated by reference.

BACKGROUND

Technical Field

The disclosure described below relates to a display panel.

As typical display panels that display videos (moving images and still images), various display panels such as liquid crystal panels and organic electro-luminescence (EL) panels have been widely used.

For example, the liquid crystal panel is a display panel using a liquid crystal composition for display. In a typical display system, a liquid crystal panel in which a liquid crystal composition is contained between an array substrate including a switching element and a color filter substrate including a color filter is irradiated with light from a backlight, and a voltage is applied to the liquid crystal composition to change the alignment of liquid crystal molecules, thereby controlling the amount of light transmitted through the liquid crystal panel. Such a liquid crystal panel has features such as thinness, light weight, and low power consumption, and thus is used for electronic devices such as televisions, smartphones, tablet terminals, and car navigation systems. Examples of the technology related to the liquid crystal panel include JP 9-127917 A, JP 2001-42282 A, JP 2001-331156 A, JP 2003-108087 A, JP 2004-318072 A, JP 2005-326809 A, JP 2008-203627 A, JP 2016-532160 T, and JP 2012-103343 A.

SUMMARY

FIG. 16 is a schematic plan view illustrating an example of a display panel having a dual-gate structure. A display panel 1R having the dual-gate structure illustrated in FIG. 16 includes pixels 1P arranged in a matrix in a longitudinal direction DR1 and a lateral direction DR2 in a display region 1AA, a first gate line 100G1 and a second gate line 100G2 arranged between the pixels 1P adjacent to each other in the longitudinal direction DR1 and extending in the lateral direction DR2, and a data line 100S arranged between the pixels 1P adjacent to each other in the lateral direction DR2 and extending in the longitudinal direction DR1. One data line 100S is arranged for each of the two pixels 1P adjacent in the lateral direction DR2.

A thin film transistor (TFT) 100T as a switching element is arranged at each of an intersection between the first gate line 100G1 and the data line 100S and an intersection between the second gate line 100G2 and the data line 100S. FIG. 16 illustrates a pattern edge 2B of a black matrix layer included in the display panel 1R.

Due to recent shortage of integrated circuits (ICs), the price of ICs has soared, and the cost of chip on glass (COG) chips has increased. As a countermeasure against this, it is conceivable to make the layout of the panel design the dual-gate structure illustrated in FIG. 16. The dual-gate structure is a structure in which two gate lines are arranged corresponding to a certain pixel row, and such aspect can reduce the number of data lines to ½ of that in the normal structure and can reduce the number of COG chips (source drivers) mounted on the panel.

Here, in recent years, the circuit of the gate driver is monolithically formed on the substrate using the same film forming material as the thin film transistor arranged in the display region in the manufacturing process of the array substrate (such circuit of the gate driver is called a gate driver monolithic (GDM) circuit). Therefore, reducing the number of data lines is effective for panel cost reduction from the viewpoint of reduction of the number of ICs of the driver. On the other hand, since the number of gate lines is doubled, there is a problem that writing time to each pixel is about ½ of that in the normal structure (single gate structure, i.e., a structure in which only one gate line is arranged between the pixels 1P adjacent in the longitudinal direction DR1 in FIG. 16).

A gaming monitor mainly displays a moving image. When viewing this moving image, the human eye recognizes both the current screen and the previous screen, and an afterimage occurs. Countermeasures against this include a technology of inserting black display between images. When this technology is carried out, the afterimage (display quality) is improved. In this technology, a panel frequency is doubled, and therefore the writing time to each pixel is about ½ of that in the normal structure (single gate structure).

Here, when both the reduction in the number of data lines and the afterimage described above are to be improved, the writing time of an image signal to each pixel is about ¼ of that in the normal structure (single gate structure). Furthermore, in recent years, a gaming monitor is required to have high frequency specifications such as 120 Hz, 166 Hz, and 240 Hz. Therefore, it is difficult to secure charging time of each pixel.

JP 9-127917 A, JP 2001-42282 A, JP 2001-331156 A, JP 2003-108087 A, JP 2004-318072 A, JP 2005-326809 A, JP 2008-203627 A, JP 2016-532160 T, and JP 2012-103343 A described above do not disclose a display panel that can reduce the number of data lines and suppress an afterimage, and can sufficiently secure charging time of each pixel.

The disclosure has been made in view of the current situation described above, and an object of the disclosure is to provide a display panel that can reduce the number of data lines and suppress an afterimage, and can sufficiently secure charging time of each pixel.

(1) One embodiment of the disclosure is a display panel including: a plurality of pixels arranged in a matrix in a longitudinal direction and a lateral direction; a plurality of pixel electrodes provided respectively corresponding to the plurality of pixels; a common electrode configured to generate an electrical field between the common electrode and each of the plurality of pixel electrodes; a first gate line, a second gate line, a third gate line, and a fourth gate line, all of which extend in the lateral direction; and a first data line, a second data line, and a common line, all of which extend in the longitudinal direction, in which the plurality of pixels include a first pixel and a second pixel adjacent to the first pixel in the lateral direction, the plurality of pixel electrodes include a first pixel electrode corresponding to the first pixel and a second pixel electrode corresponding to the second pixel, the first gate line and the fourth gate line are arranged on one side of the first pixel electrode in the longitudinal direction, the second gate line is arranged on an other side of the first pixel electrode in the longitudinal direction, the third gate line is arranged to overlap the first pixel electrode and the second pixel electrode between the first gate line and the second gate line, the common line is arranged between the first pixel electrode and the second pixel electrode, the first data line is arranged between the first pixel electrode and a pixel electrode, among the plurality of pixel electrodes, adjacent on a side opposite to the second pixel electrode with respect to the first pixel electrode in the lateral direction, the second data line is arranged between the second pixel electrode and a pixel electrode, among the plurality of pixel electrodes, adjacent on a side opposite to the first pixel electrode with respect to the second pixel electrode in the lateral direction, and the display panel further includes a first switching element connected to the first pixel electrode, the common line, and the third gate line, and a second switching element connected to the second pixel electrode, the common line, and the third gate line.

(2) An embodiment of the disclosure is the display panel further including, in addition to the configuration of (1): a third switching element connected to the first pixel electrode, the first data line, and the first gate line; and a fourth switching element connected to the second pixel electrode, the second data line, and the second gate line.

(3) An embodiment of the disclosure is the display panel in which, in addition to the configuration of (2), an area of the first switching element in plan view and an area of the second switching element in plan view are equal to or less than an area of the third switching element in plan view and an area of the fourth switching element in plan view, respectively.

(4) An embodiment of the disclosure is the display panel in which, in addition to the configuration of (3), the area of the first switching element in plan view and the area of the second switching element in plan view are smaller than the area of the third switching element in plan view and the area of the fourth switching element in plan view, respectively.

(5) An embodiment of the disclosure is the display panel in which, in addition to the configuration of (2), a channel width of the first switching element and a channel width of the second switching element are equal to or less than a channel width of the third switching element and a channel width of the fourth switching element, respectively.

(6) An embodiment of the disclosure is the display panel in which, in addition to the configuration of (5), the channel width of the first switching element and the channel width of the second switching element are smaller than the channel width of the third switching element and the channel width of the fourth switching element, respectively.

(7) An embodiment of the disclosure is the display panel in which, in addition to the configuration of (1), (2), (3), (4), (5), or (6), the first gate line and the fourth gate line are arranged between the first pixel electrode and a pixel electrode, among the plurality of pixel electrodes, adjacent on the one side in the longitudinal direction of the first pixel electrode, and the second gate line is arranged between the first pixel electrode and a pixel electrode, among the plurality of pixel electrodes, adjacent on the other side in the longitudinal direction of the first pixel electrode.

(8) An embodiment of the disclosure is the display panel in which, in addition to the configuration of (1), (2), (3), (4), (5), (6), or (7), at least one of the first pixel electrode and the common electrode includes a slit including a bent portion, and the third gate line overlaps the bent portion in plan view.

(9) An embodiment of the disclosure is the display panel in which, in addition to the configuration of (1), (2), (3), (4), (5), (6), (7), or (8), the common line is connected to a ground wiring line to which a ground signal is supplied.

(10) An embodiment of the disclosure is the display panel in which, in addition to the configuration of (1), (2), (3), (4), (5), (6), (7), or (8), the common line is connected to the common electrode.

(11) An embodiment of the disclosure is the display panel further including, in addition to the configuration of (1), (2), (3), (4), (5), (6), (7), (8), or (10), a touch panel electrode that is an electrode in which the common electrode is divided, in which the common line is connected to the touch panel electrode and functions as a touch panel wiring line.

(12) An embodiment of the disclosure is the display panel further including, in addition to the configuration of (1), (2), (3), (4), (5), (6), (7), (8), (10), or (11), a contact hole between the first gate line and the fourth gate line, the contact hole to which the common line and the common electrode are connected.

(13) An embodiment of the disclosure is the display panel in which, in addition to the configuration of (1), (2), (3), (4), (5), (6), (7), (8), (9), (10), (11), or (12), assuming that a length of the pixel electrode in the longitudinal direction is D, a distance between each of the third gate line, the first switching element, and the second switching element and an end portion of the pixel electrode in the longitudinal direction is equal to or greater than D/3 and equal to or less than 2D/3.

(14) An embodiment of the disclosure is the display panel further including, in addition to the configuration of (1), (2), (3), (4), (5), (6), (7), (8), (9), (10), (11), (12), or (13): a first gate driver configured to drive the first gate line, the second gate line, and the fourth gate line; and a second gate driver configured to drive the third gate line, in which the first gate driver is arranged on one side in the lateral direction, and the second gate driver is arranged on an other side in the lateral direction.

(15) An embodiment of the disclosure is the display panel further including, in addition to the configuration of (1), (2), (3), (4), (5), (6), (7), (8), (9), (10), (11), (12), (13), or (14): a fifth gate line extending in the lateral direction and overlapping a pixel electrode, among the plurality of pixel electrodes, adjacent on the one side in the longitudinal direction of the first pixel electrode; a first gate driver configured to drive the first gate line, the second gate line, and the fourth gate line; and a second gate driver configured to drive the third gate line and the fifth gate line, in which a period in which a signal input from the second gate driver to the third gate line has a high potential and a period in which a signal input from the second gate driver to the fifth gate line has a high potential overlap each other in at least some period.

(16) An embodiment of the disclosure is the display panel in which, in addition to the configuration of (15), the signal input to the third gate line and the signal input to the fifth gate line are a same signal.

(17) An embodiment of the disclosure is the display panel further including, in addition to the configuration of (1), (2), (3), (4), (5), (6), (7), (8), (9), (10), (11), (12), (13), or (14): a fifth gate line extending in the lateral direction and overlapping a pixel electrode, among the plurality of pixel electrodes, adjacent on the one side in the longitudinal direction of the first pixel electrode; a first gate driver configured to drive the first gate line, the second gate line, and the fourth gate line; and a second gate driver configured to drive the third gate line and the fifth gate line, in which a period in which a signal input from the second gate driver to the third gate line has a high potential and a period in which a signal input from the second gate driver to the fifth gate line has a high potential do not overlap each other.

(18) An embodiment of the disclosure is the display panel further including, in addition to the configuration of (1), (2), (3), (4), (5), (6), (7), (8), (9), (10), (11), (12), (13), (14), (15), (16), or (17): a first gate driver configured to drive the first gate line, the second gate line, and the fourth gate line; and a second gate driver configured to drive the third gate line, in which in a first period within one frame period, the first gate driver drives the first gate line, the second gate line, and the fourth gate line, and writes, to each of the plurality of pixels, an image signal having an area of equal to or greater than ½ of an area of each of the plurality of pixels, and in a second period following the first period of the one frame period, the second gate driver drives the third gate line, and writes a ground signal or a common electrode signal to each of the plurality of pixels.

According to the disclosure, it is possible to provide a display device that can reduce the number of data lines and suppress an afterimage, and can sufficiently secure charging time of each pixel.

BRIEF DESCRIPTION OF DRAWINGS

The disclosure will be described with reference to the accompanying drawings, wherein like numbers reference like elements.

FIGS. 9A to 9I are schematic views illustrating a case where timing points of Vgh of two third gate lines adjacent to each other are overlapped.

FIGS. 10A to 10I are schematic views illustrating a case where two third gate lines adjacent to each other are simultaneously driven.

DESCRIPTION OF EMBODIMENTS

Definition of Terms

In the present description, the longitudinal direction and the lateral direction are merely names for convenience of distinguishing two orthogonal directions in a screen (display surface) of a display panel, and are not directly related to the longitudinal and the lateral in a use state of the display panel. When one direction in which a plurality of pixels arranged in a matrix are aligned is a longitudinal direction, a direction perpendicular to the longitudinal direction is called a lateral direction.

In the present description, the observation surface side means a side closer to the screen (display surface) of the display panel, and the back surface side means a side farther from the screen (display surface) of the display panel.

In the present description, the azimuth means a direction when a target direction is projected on a screen of the display panel, and is expressed by an angle (azimuth angle) formed between the direction and a reference azimuth. Here, the reference azimuth(0°) is set in the horizontal right direction of the screen of the display panel. The azimuth counterclockwise angle is a positive angle and the azimuth clockwise angle is a negative angle. Both the counterclockwise direction and the clockwise direction represent the rotation direction when the screen of the display panel is viewed from the observation surface side (front side). The angle represents a value measured in a state where the display panel is viewed in plan view, and that two straight lines (including axis, direction, and ridgeline) are orthogonal to each other means that the two straight lines are orthogonal to each other in a state where the display panel is viewed in plan view.

In the present description, that two axes are orthogonal to each other means that an angle formed by the two axes is 90°±3°, preferably 90°±1°, more preferably 90°±0.5°, and particularly preferably 90° (completely orthogonal). That two axes are parallel means that an angle formed by the two axes is 0°±3°, preferably 0°±1°, more preferably 0°±0.5°, and particularly preferably 0° (completely parallel).

Embodiments according to the disclosure will be described hereinafter. The technology according to the disclosure is not limited to the contents described in the following embodiments, and appropriate design changes can be made within a scope that satisfies the configuration according to the disclosure. In the description below, the same reference signs are appropriately used in common among the different drawings for the same parts or parts having similar functions, and repeated description thereof will be omitted as appropriate. The aspects of the disclosure may be combined as appropriate within a range that does not depart from the gist of the disclosure.

First Embodiment

Figure 1:
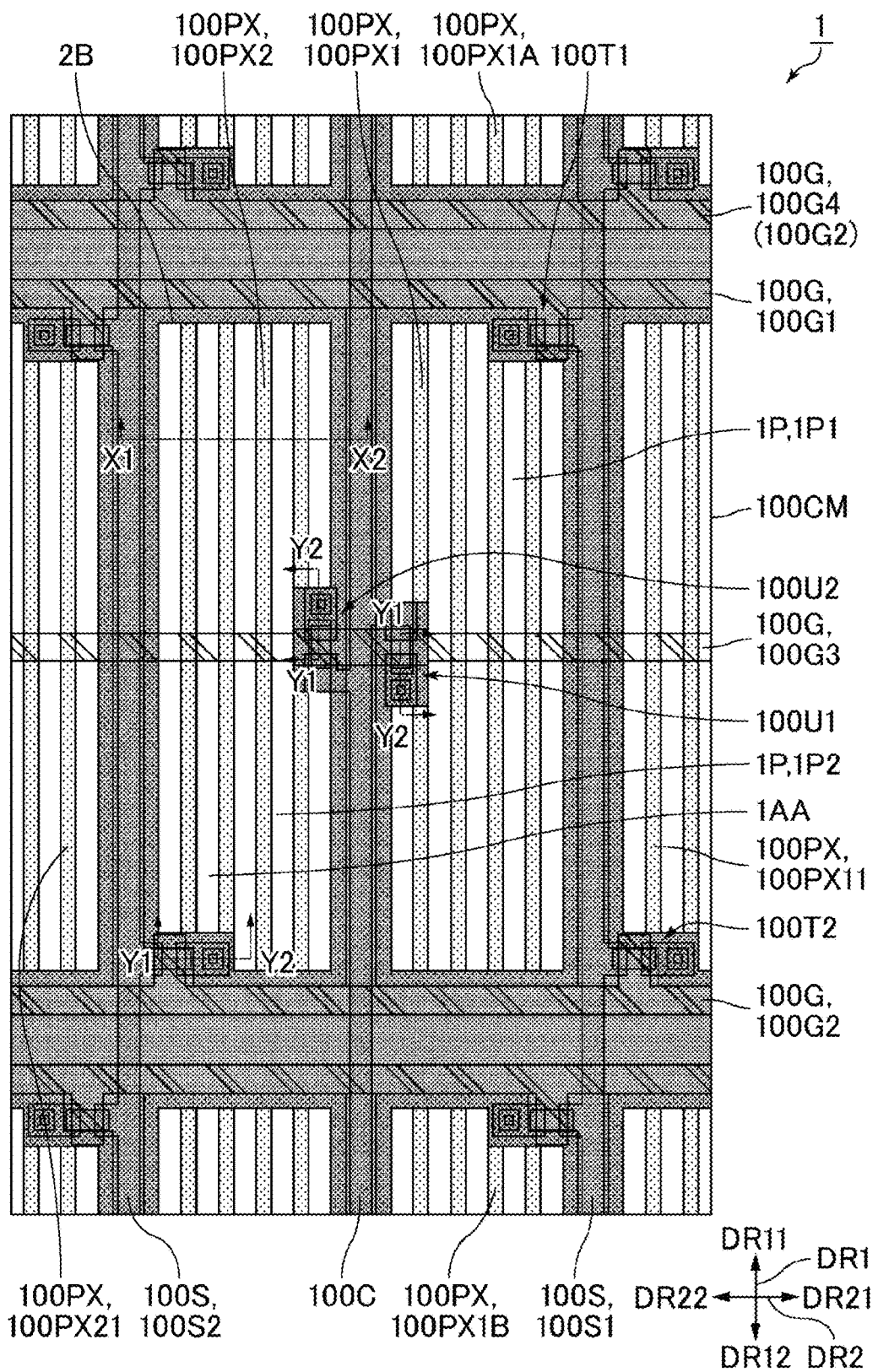
FIG. 1 is a schematic plan view of a display panel of a first embodiment.
Figure 2:
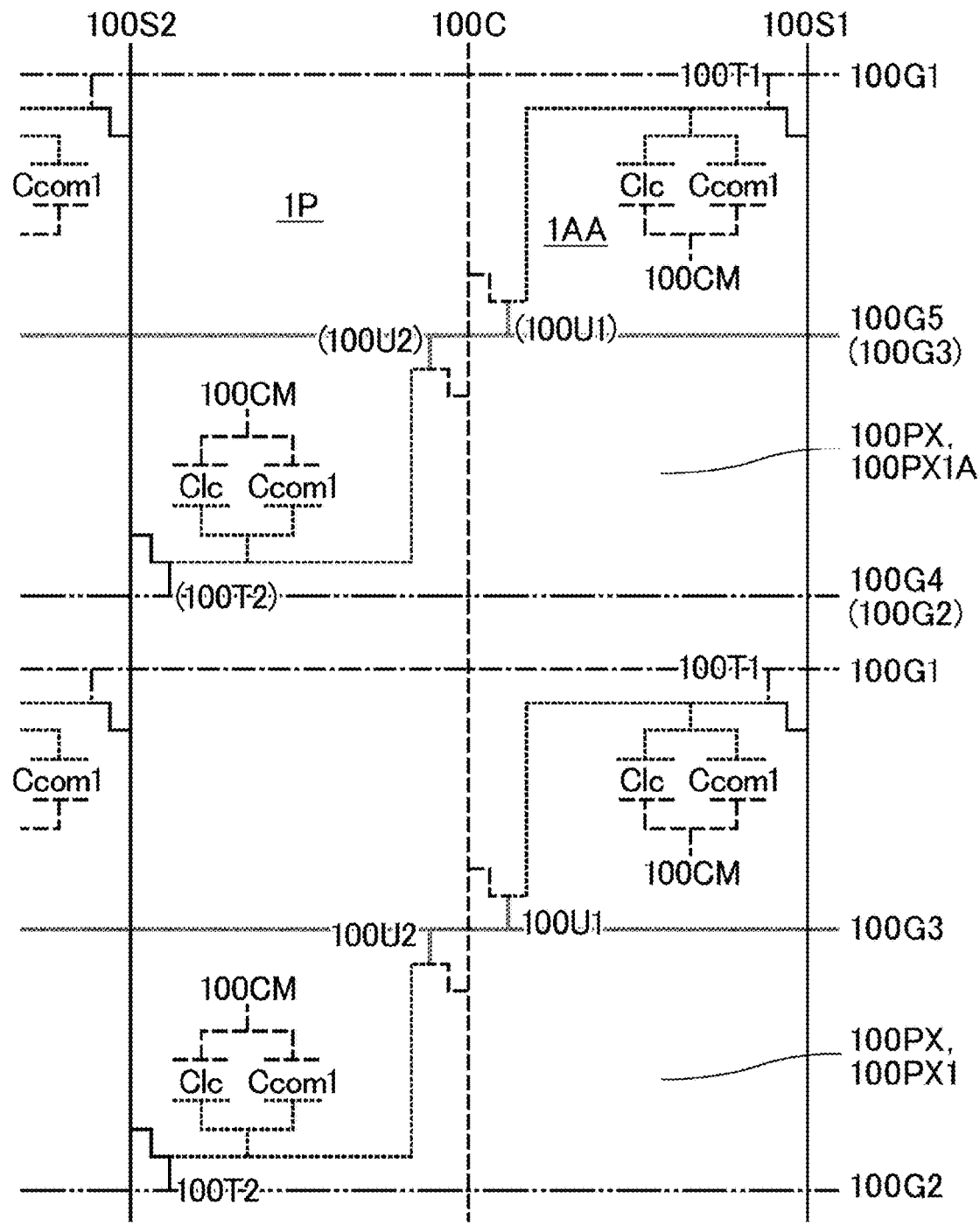
FIG. 2 is a circuit diagram of the display panel of the first embodiment.

FIG. 1 is a schematic plan view of the display panel of the first embodiment. FIG. 2 is a circuit diagram of the display panel of the first embodiment. As illustrated in FIGS. 1 and 2, a display panel 1 of the present embodiment includes the plurality of pixels 1P arranged in a matrix in the longitudinal direction DR1 and the lateral direction DR2, a plurality of pixel electrodes 100PX provided respectively corresponding to the plurality of pixels 1P, a common electrode 100 CM that generates an electrical field between the common electrode 100 CM and each of the plurality of pixel electrodes 100PX, a first gate line 100G1, a second gate line 100G2, and a fourth gate line 100G4 extending in the lateral direction DR2, and a first data line 100S1 and a second data line 100S2 extending in the longitudinal direction DR1. The plurality of pixels 1P includes a first pixel 1P1 and a second pixel 1P2 adjacent to the first pixel 1P1 in the lateral direction DR2. The plurality of pixel electrodes 100PX include a first pixel electrode 100PX1 corresponding to the first pixel 1P1 and a second pixel electrode 100PX2 corresponding to the second pixel 1P2. The first gate line 100G1 and the fourth gate line 100G4 are arranged on one side DR11 of the first pixel electrode 100PX1 in the longitudinal direction DR1, and the second gate line 100G2 is arranged on an other side DR12 of the first pixel electrode 100PX1 in the longitudinal direction DR1. The first data line 100S1 is arranged between the first pixel electrode 100PX1 and a pixel electrode 100PX11 adjacent on the side opposite to the second pixel electrode 100PX2 in the lateral direction DR2 with respect to the first pixel electrode 100PX1. The second data line 100S2 is arranged between the second pixel electrode 100PX2 and a pixel electrode 100PX21 adjacent on the side opposite to the first pixel electrode 100PX1 in the lateral direction DR2 with respect to the second pixel electrode 100PX2.

Such aspect can achieve a dual-gate structure, and can reduce the number of data lines to ½ of that in a normal structure (single gate structure). As a result, the number of COG chips of a source driver to be mounted on the display panel can be reduced, and cost reduction can be achieved. In the present description, "overlap" means overlapping in plan view. A display region 1AA is also called a pixel portion or a display portion.

Furthermore, in the present embodiment, reduction of the number of data lines can reduce the area in which a part on which the COG chip is mounted and a part where the data line is drawn from the COG chip and reaches the display region are arranged, and therefore the outer shape of the display panel can be reduced.

Due to the recent shortage of ICs, the price of ICs has soared, and the cost of the COG chips has increased. As a countermeasure against this, in the present embodiment, the layout of the panel design is made the dual-gate structure, whereby the number of the data lines 100S can be made ½ of that in the single gate structure, and the number of COG chips (source drivers) to be mounted on the panel can be reduced. Here, since the gate driver is formed by the GDM circuit described above, reducing the number of data lines is effective for panel cost reduction from the viewpoint of reduction of the number of ICs of the driver.

Here, the gaming monitor mainly displays a moving image. When viewing this moving image, the human eye recognizes both the current screen and the previous screen, and an afterimage occurs. Countermeasures against this include a technology of inserting black display between images, and when this is carried out, the afterimage (display quality) is improved. In the technology, since the panel frequency is doubled, the writing time to each pixel is about ½ of the writing time in a case of not carrying out such technology.

When both the reduction of the number of data lines by the dual-gate structure and the improvement of the afterimage by the black display insertion are performed, the image signal writing time to each pixel becomes about ¼ of the writing time in a case of not doing so. Furthermore, since in recent years, a gaming monitor is required to have high frequency specifications such as 120 Hz, 166 Hz, and 240 Hz, it is difficult to secure charging time of a subpixel. The display panel 1 of the present embodiment can improve this problem as follows.

That is, the display panel 1 of the present embodiment further includes a third gate line 100G3 extending in the lateral direction DR2 and a common line 100C extending in the longitudinal direction DR1. The third gate line 100G3 is arranged to overlap the first pixel electrode 100PX1 and the second pixel electrode 100PX2 between the first gate line 100G1 and the second gate line 100G2. The common line 100C is arranged between the first pixel electrode 100PX1 and the second pixel electrode 100PX2. The display panel 1 further includes a first switching element 100U1 connected to the first pixel electrode 100PX1, the common line 100C, and the third gate line 100G3, and a second switching element 100U2 connected to the second pixel electrode 100PX2, the common line 100C, and the third gate line 100G3. The common line 100C is connected, for example, to a ground (GND) and receives a ground signal (GND signal), or connected to the common electrode 100 CM and receives an identical signal to the signal input to the common electrode 100 CM (also called a common electrode signal or a COM signal). Therefore, for example, all the common lines 100C can be connected in parallel to one trunk wiring line outside the display region 1AA.

The display panel 1 of the present embodiment having such configuration can be driven as follows, for example. Similarly to the related art, the image signal is sequentially written downward from the top of the screen, for example, in a progressive manner with respect to the display panel 1 of the present embodiment. From the time point at which the image signal of a region of equal to or greater than ½ (upper half) of the screen is written, the third gate line 100G3 is driven to bring the first switching element 100U1 and the second switching element 100U2 into an on state, whereby the GND or COM signal (hereinafter, the GND or COM signal is collectively called a "black signal") is sequentially written into the pixel 1P downward from the top of the screen. As a result, in a case of normally black, black display is performed, and therefore black can be written on the screen. Switching timing point between the image signal and the black signal can be appropriately set by changing timing point at which a high signal (Vgh) is input to the third gate line 100G3.

Liquid crystal capacitance Clc in FIG. 2 represents capacitance formed via at least a liquid crystal layer between the pixel electrode 100PX and the common electrode 100 CM. Auxiliary capacitance Ccom1 (also called storage capacitance) represents capacitance formed via an inorganic insulating layer or the like without via a liquid crystal layer between the pixel electrode 100PX and the common electrode 100 CM, and is arranged in parallel with the liquid crystal capacitance Clc. The auxiliary capacitance Ccom1 is provided to suppress the potential of the pixel electrode 100PX from fluctuating due to charge leakage from the first switching element 100U1 or the second switching element 100U2 when the first switching element 100U1 or the second switching element 100U2 is in an off state.

Such aspect enables the image signal and the black signal to be simultaneously written in one frame, and thus the afterimage can be improved while securing the writing time to each pixel 1P of about ½ of that in the normal structure (single gate structure) as in the case of adopting the dual-gate structure.

On the other hand, in JP 9-127917 A, in addition to a gate line, a data line, and a transistor for writing an image signal, a gate line, a data line, and a transistor for writing a black signal are arranged, and black signal writing for countermeasures against the afterimage is performed. The panel frequency is the same as driving in a case where there is no black signal writing in a normal single gate structure that is not a dual-gate structure.

As described above, the liquid crystal display device of JP 9-127917 A has a single gate structure, and the numbers of the gate lines and the data lines are simply doubled. Therefore, the number of wiring lines in the display region is large. More specifically, one data line for black signal writing is arranged for each pixel column. The dual-gate structure is not disclosed, and there is a problem in panel cost and outer shape reduction of the display panel.

As described above, JP 9-127917 A has a configuration in which one data line for black signal writing (corresponding to the common line 100C of the present embodiment) is arranged for each pixel column. If this configuration is applied to the dual-gate structure as it is, there are concerns about an aperture ratio decrease, a load increase in the gate line, and the like. On the other hand, only one common line 100C included in the display panel 1 of the present embodiment is arranged for every two pixel columns in an absent region of the data lines (the first data line 100S1 and the second data line 100S2), and the aperture ratio decrease and the like can be suppressed.

The dual-gate structure is disclosed in JP 2012-103343 A. A common signal wiring line 52 in JP 2012-103343 A is considered to correspond to the common line 100C of the present embodiment. Here, JP 9-127917 A can be said to have a configuration in which one gate line for black signal writing (corresponding to the third gate line 100G3 of the present embodiment) is arranged for one gate line. From this viewpoint, when JP 9-127917 A is applied to JP 2012-103343 A (a configuration in which two gate lines are arranged for each pixel row), two gate lines for black signal writing can be arranged for each pixel row. On the other hand, only one third gate line 100G3 of the present embodiment is arranged in a center part of each pixel row. Furthermore, two transistors for black signal writing (the first switching element 100U1 and the second switching element 100U2) are arranged adjacent to the third gate line 100G3. Therefore, the display panel 1 of the present embodiment is different from a configuration in which JP 9-127917 A and JP 2012-103343 A are simply combined. Hereinafter, the display panel of the present embodiment will be described in detail.

Figure 3:
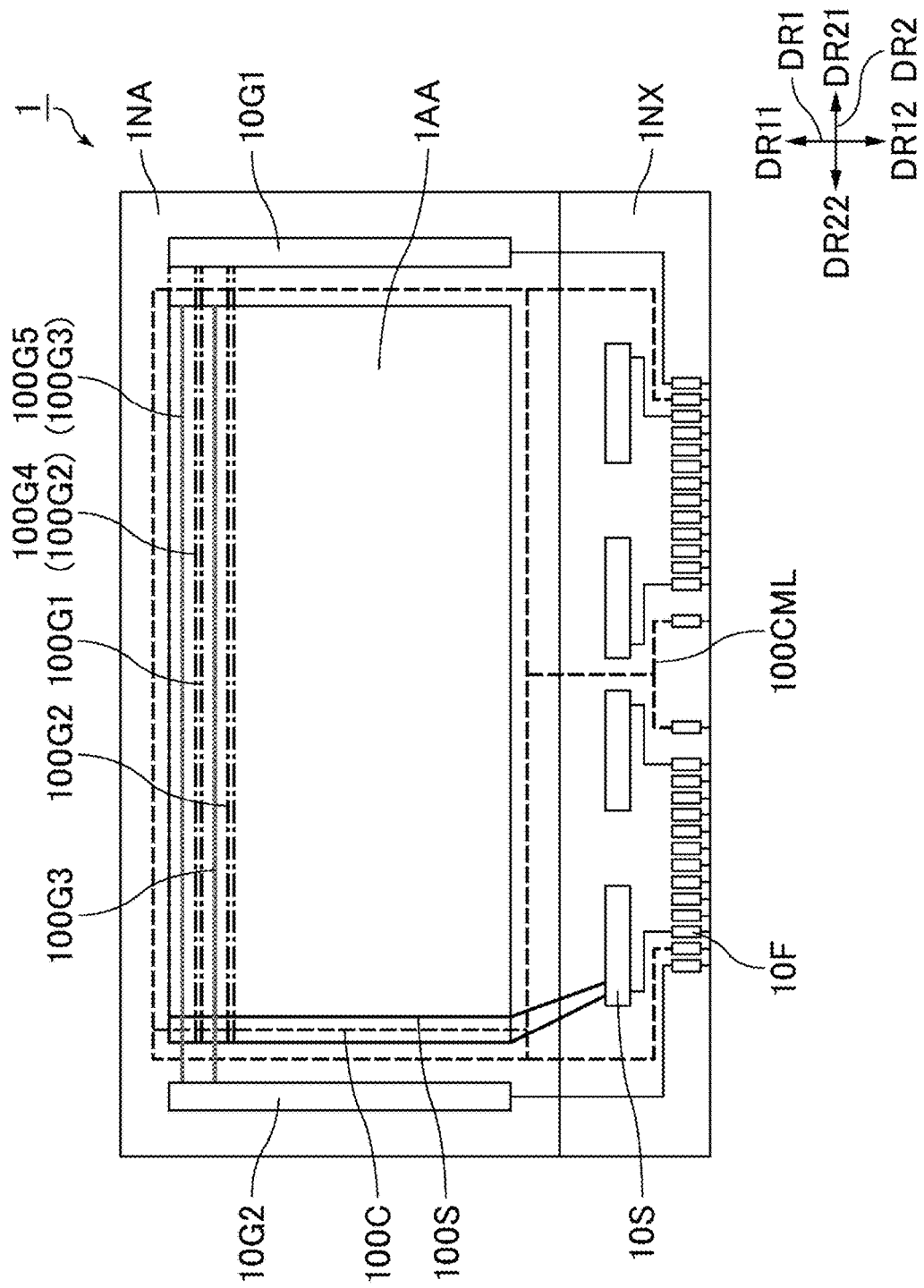
FIG. 3 is an example of a schematic plan view illustrating the entire display panel of the first embodiment.
Figure 4:
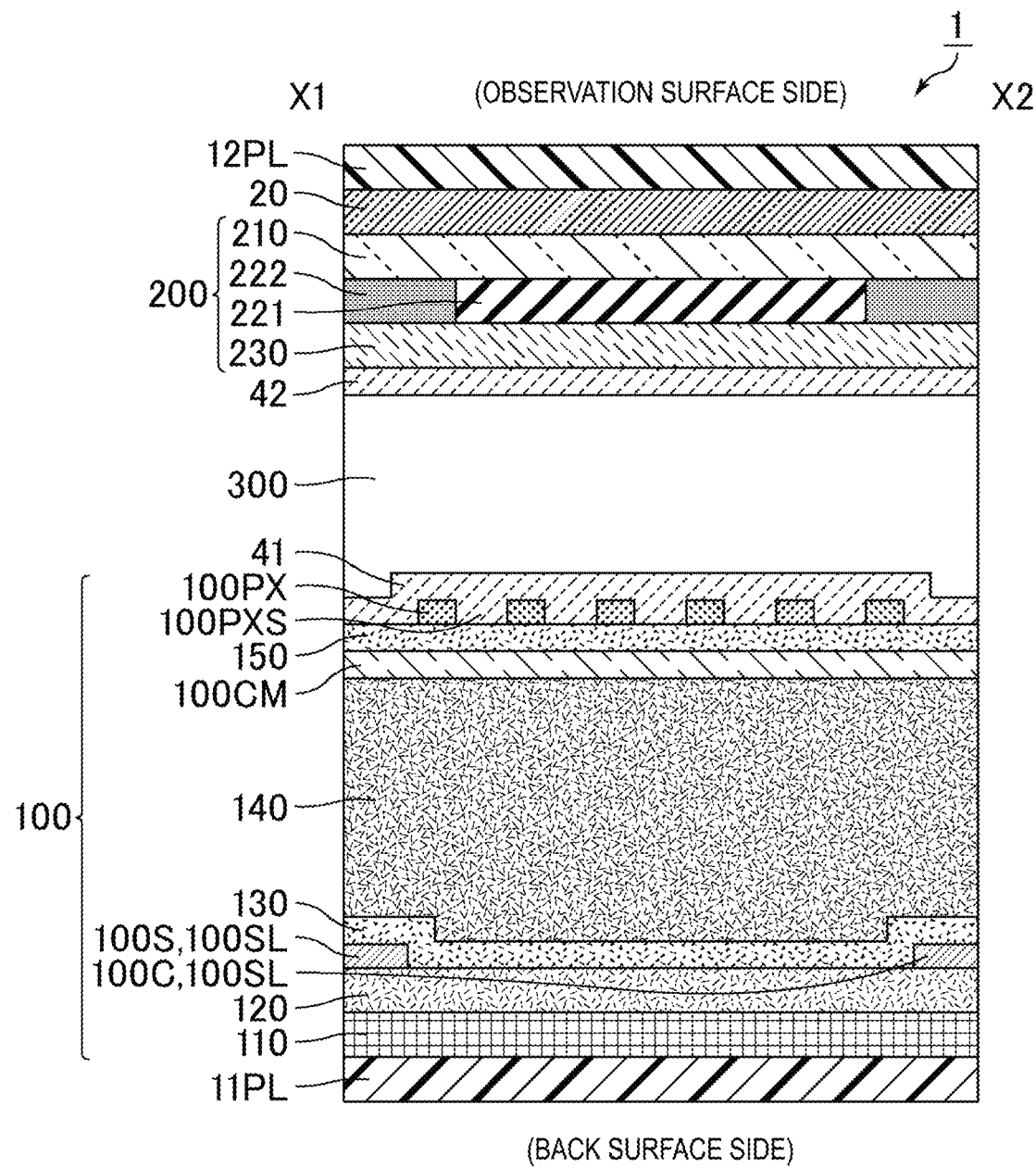
FIG. 4 is a schematic cross-sectional view of the display panel of the first embodiment taken along line X1-X2 in FIG. 1.
Figure 5:
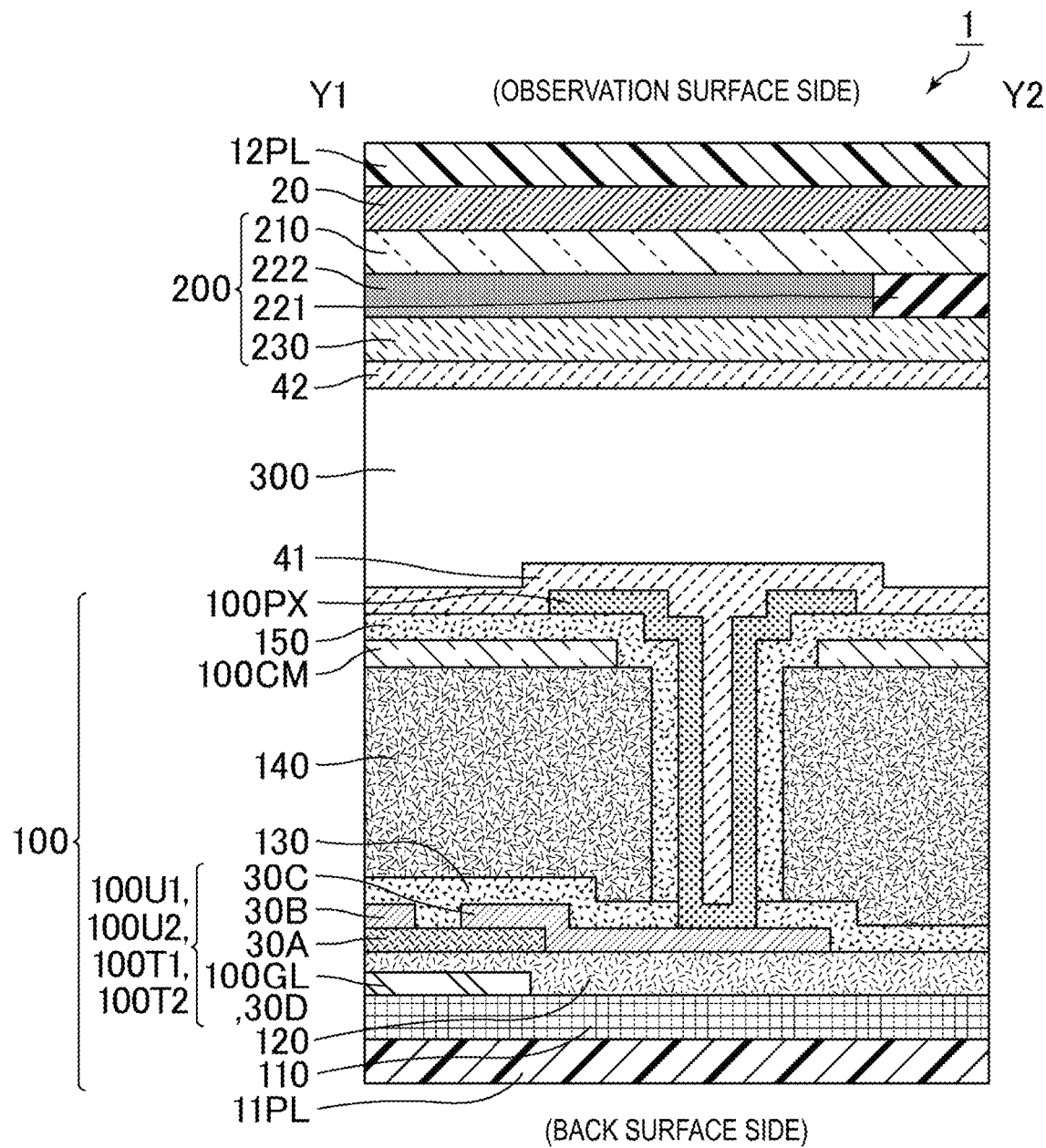
FIG. 5 is a schematic cross-sectional view of the display panel of the first embodiment taken along line Y1-Y2 in FIG. 1.

FIG. 3 is an example of a schematic plan view illustrating the entire display panel of the first embodiment. FIG. 4 is a schematic cross-sectional view of the display panel of the first embodiment taken along line X1-X2 in FIG. 1. FIG. 5 is a schematic cross-sectional view of the display panel of the first embodiment taken along line Y1-Y2 in FIG. 1.

As illustrated in FIGS. 3 to 5, the display panel 1 of the present embodiment includes a first substrate 100, a second substrate 200 arranged opposite to the first substrate 100, and a liquid crystal layer 300 sandwiched between the first substrate 100 and the second substrate 200. The display panel 1 includes the first substrate 100, the liquid crystal layer 300, and the second substrate 200 in order, for example, from the back surface side toward the observation surface side.

The first substrate 100 includes a support substrate 110, a gate wiring line layer 100GL in which the first gate line 100G1, the second gate line 100G2, the third gate line 100G3, and the fourth gate line 100G4 are arranged, a gate insulating film 120, a data wiring line layer 100SL in which the first data line 100S1, the second data line 100S2, and the common line 100C are arranged, a first insulating film 130, a second insulating film 140, the common electrode 100CM, a third insulating film 150, and the pixel electrode 100PX in order from the back surface side toward the observation surface side. Here, the first gate line 100G1, the second gate line 100G2, the third gate line 100G3, and the fourth gate line 100G4 are also simply called gate lines 100G. The first data line 100S1 and the second data line 100S2 are also simply called data lines 100S.

As illustrated in FIGS. 3 to 5, the second substrate 200 includes a support substrate 210, a color filter layer 221, a black matrix layer 222, and an overcoat layer 230 in order from the observation surface side toward the back surface side. The second substrate 200 is also called a color filter (CF) substrate.

The liquid crystal layer 300 contains liquid crystal molecules. A first alignment film 41 is provided between the first substrate 100 and the liquid crystal layer 300, and a second alignment film 42 is provided between the second substrate 200 and the liquid crystal layer 300.

Furthermore, a first polarizer 11PL is arranged on the back surface side of the first substrate 100, and a second polarizer 12PL is arranged on the observation surface side of the second substrate 200.

The support substrates 110 and 210 are preferably transparent substrates, and examples thereof include glass substrates and plastic substrates.

The gate wiring line layer 100GL and the data wiring line layer 100SL are a single layer or a plurality of layers of a metal such as copper, titanium, aluminum, molybdenum, and tungsten, or alloys thereof. Various wiring lines and electrodes constituting the first gate line 100G1, the second gate line 100G2, the third gate line 100G3, the fourth gate line 100G4, the first data line 100S1, the second data line 100S2, the common line 100C, the first switching element 100U1, the second switching element 100U2, a third switching element 100T1, and a fourth switching element 100T2 can be formed by depositing, in a single layer or a plurality of layers, a metal such as copper, titanium, aluminum, molybdenum, and tungsten, or alloys thereof by a sputtering method or the like, and subsequently performing patterning by a photolithography method or the like. When these various wiring lines and electrodes are formed in the same layer, manufacturing can be efficiently implemented by using the same material for the various wiring lines and electrodes.

The gate insulating film 120 is an inorganic insulating film, for example. Examples of the inorganic insulating film that can be used include inorganic films (relative dielectric constant $\varepsilon=5$ to 7) such as silicon nitride (SiNx) and silicon oxide ($SiO_2$), or a layered film thereof.

The first insulating film 130, the second insulating film 140, and the third insulating film 150 are, for example, inorganic insulating films, organic insulating films, or layered bodies of the organic insulating films and the inorganic insulating films. Examples of the inorganic insulating film that can be used include inorganic films (relative dielectric constant $\varepsilon=4$ to 8) such as silicon nitride (SiNx) and silicon oxide ($SiO_2$), or a layered film thereof. Examples of the organic insulating film that can be used include organic films having a small relative dielectric constant (relative dielectric constant $\varepsilon=2$ to 4) such as a photosensitive acrylic resin, or a layered film thereof.

The first insulating film 130 and the third insulating film 150 are preferably inorganic insulating films. The second insulating film 140 is preferably an organic insulating film, and the thickness of the second insulating film 140 is preferably greater than the thickness of the third insulating film 150.

The common electrode 100 CM is an electrode formed on substantially an entire surface except for a specific part such as a connection portion (contact hole) between the pixel electrode 100PX and a drain electrode regardless of a boundary of the pixel 1P. The common electrode 100 CM is supplied with a common signal kept at a constant value, and the common electrode 100 CM is kept at a constant potential.

The pixel electrode 100PX is an electrode arranged for each pixel 1P. The pixel electrode 100PX is electrically connected to the corresponding data line 100S and the common line 100C via a semiconductor layer included in the TFT. The pixel electrode 100PX is set to a potential according to the data signal or the black signal supplied via the corresponding switching element (TFT).

As illustrated in FIG. 4, the pixel electrode 100PX is provided with a plurality of slits 100PXS parallel to one another. The slits 100PXS are preferably provided aslope with respect to an initial alignment azimuth of the liquid crystal molecules. By giving an angle to the slits 100PXS provided in the pixel electrode 100PX with respect to the initial alignment azimuth of the liquid crystal molecules, the liquid crystal molecules can be rotated in a certain direction, and the alignment of the liquid crystal molecules can be controlled by voltage control.

The common electrode 100 CM and the pixel electrode 100PX are preferably transparent electrodes. Examples of the material of the common electrode 100 CM and the pixel electrode 100PX include indium tin oxide (ITO) and indium zinc oxide (IZO).

The color filter layer 221 has a configuration in which a red color filter, a green color filter, and a blue color filter are arranged in a plane and partitioned by the black matrix layer 222. Each of the red color filter, the green color filter, and the blue color filter is made of, for example, a transparent resin containing a pigment. Normally, a combination of the red color filter, the green color filter, and the blue color filter is arranged in all pixels, and a desired color is obtained in each pixel by mixing colors while controlling the amount of color light transmitted through the red color filter, the green color filter, and the blue color filter. The thicknesses of the red color filter, the green color filter, and the blue color filter need not be identical. That is, the surface on the liquid crystal layer 300 side of the color filter layer 221 needs not be flat.

The black matrix layer 222 is arranged in a lattice pattern to partition each color filter provided in the color filter layer 221. FIG. 1 illustrates a pattern edge 2B of the black matrix layer 222 included in the display panel 1. The material of the black matrix layer 222 is not particularly limited as long as it has a light shielding property, but a resin material containing a black pigment or a metal material having a light shielding property is suitably used. The black matrix layer 222 is formed by a photolithography method in which, for example, a film is formed by applying a photosensitive resin containing a black pigment, and exposure, development, and the like are performed.

The overcoat layer 230 flattens the surface on the liquid crystal layer 300 side of the second substrate 200, and for example, an organic film (relative dielectric constant ε=3 to 4) can be used. The overcoat layer 230 is formed by, for example, applying a photocurable resin, and performing ultraviolet irradiation and firing.

The liquid crystal layer 300 contains liquid crystal molecules, and controls the light transmission amount by changing the alignment of the liquid crystal molecules according to the electrical field generated in the liquid crystal layer 300 by the voltage applied between the common electrode 100 CM and the pixel electrode 100PX constituting a pair of electrodes. The liquid crystal molecules in the liquid crystal layer 300 are aligned by a restraining force of the first alignment film 41 and the second alignment film 42 in a state where no voltage is applied between the pair of electrodes (at the time of no voltage application), and rotate according to the electrical field generated in the liquid crystal layer 300 in a state where a voltage is applied between the pair of electrodes (at the time of voltage application).

In the liquid crystal molecules, a dielectric constant anisotropy (Δε) defined by the following equation may have a positive value or may have a negative value. Liquid crystal molecules having a positive dielectric constant anisotropy are also called positive liquid crystals, and liquid crystal molecules having a negative dielectric constant anisotropy are also called negative liquid crystals. A major axis direction of the liquid crystal molecules is a direction of a slow axis.

$$\Delta\varepsilon = \text{(Dielectric constant in major axis direction)} - \text{(Dielectric constant in minor axis direction)}$$

The first alignment film 41 and the second alignment film 42 have a function of controlling the alignment of the liquid crystal molecules in the liquid crystal layer 300, and when the voltage applied to the liquid crystal layer 300 is less than a threshold voltage (including no voltage application), the alignment of the liquid crystal molecules in the liquid crystal layer is controlled mainly by an action of the alignment film.

As the material of the alignment film, a general material in the field of liquid crystal display panels such as a polymer having polyimide in the main chain, a polymer having polyamic acid in the main chain, and a polymer having polysiloxane in the main chain can be used. The alignment film can be formed by applying an alignment film material, and the coating method is not particularly limited. For example, flexographic printing, ink-jet coating, or the like can be used.

The alignment film is a horizontal alignment film that aligns liquid crystal molecules substantially horizontally with respect to a film surface. The alignment film may be a photo-alignment film having a photo-functional group and subjected to photo-alignment treatment as alignment treatment, or may be a rubbing alignment film subjected to rubbing treatment as alignment treatment.

The horizontal alignment film has a function of aligning the liquid crystal molecules in the liquid crystal layer in the horizontal direction with respect to the surface of the horizontal alignment film in the pixel region at the time of no voltage application to the liquid crystal layer (when the voltage applied to the liquid crystal layer is less than the threshold voltage). Here, that the liquid crystal molecules are aligned in the horizontal direction with respect to the surface of the horizontal alignment film means that a pre-tilt angle of the liquid crystal molecules is equal to or greater than 0° and equal to or less than 5°, preferably equal to or greater than 0° and equal to or less than 2°, and more preferably equal to or greater than 0° and equal to or less than 1° with respect to the surface of the horizontal alignment film.

As a method of the alignment treatment applied to the alignment film, a rubbing method of rubbing the alignment film surface with a roller or the like has been widely used typically. On the other hand, in recent years, a photo-alignment method of irradiating an alignment film surface with light has been widely developed as a method of alignment treatment in place of the rubbing method. According to the photo-alignment method, the alignment treatment can be performed without coming into contact with the surface of the alignment film, and thus, unlike the rubbing treatment, there is an advantage that generation of dirt, dust, and the like during the alignment treatment can be suppressed.

The first polarizer 11PL and the second polarizer 12PL are preferably linear polarizers. As the first polarizer 11PL and the second polarizer 12PL, it is possible to use polarizing plates (absorptive polarizers) in which, for example, an anisotropic material such as an iodine complex (or dye) is dyed and adsorbed on a polyvinyl alcohol (PVA) film and then stretched and aligned. Normally, in order to secure mechanical strength and resistance to moisture and heat, a protection film such as a triacetyl cellulose (TAC) film is laminated on both sides of the PVA film and put to practical use.

The polarization axis of the first polarizer 11PL and the polarization axis of the second polarizer 12PL are preferably orthogonal to each other. According to such configuration, the first polarizer 11PL and the second polarizer 12PL are arranged in crossed Nicol, a good black display state can be achieved at the time of no voltage application.

The display panel 1 may further include a conductive layer 20 between the second substrate 200 and the second polarizer 12PL.

The conductive layer 20 is a layer having conductivity. The conductive layer 20 has a function of prevention of static charge. The sheet resistance of the conductive layer 20 is, for example, equal to or greater than $1.0 \times 10^2$ Ω/sq and equal to or less than $1.0 \times 10^3$ Ω/sq. The film thickness of the conductive layer 20 is, for example, 15 nm to 30 nm.

Here, when the operation mode is an FFS (IPS) mode, both the pixel electrode and the common electrode for imparting an electrical field to the liquid crystal layer are arranged on the array substrate (first substrate) side, and are not arranged on a CF substrate (second substrate) side. Therefore, as compared with the array substrate, in the CF substrate, static charge (charge-up) occurs on the surface and charges are likely to accumulate, and the alignment state of the liquid crystal molecules of the liquid crystal layer is disturbed by the influence of the accumulated charges, and as a result, a display defect may occur.

On the other hand, the display panel 1 of the present embodiment includes the conductive layer 20 on the outer surface side (observation surface side) of the CF substrate (second substrate 200), and the conductive layer 20 is electrically connected to the ground via a predetermined connection member. Such aspect can release the charges charged on the surface of the CF substrate to the ground, and therefore static charge becomes less likely to occur on the surface. As a result, disturbance becomes less likely to occur in the alignment state of the liquid crystal molecules contained in the liquid crystal layer 300, and a display defect becomes less likely to occur.

The conductive layer 20 is provided solidly over substantially the entire region of the outer surface (surface on the observation surface side) of the CF substrate (second substrate 200). The substantially entire region of the outer surface (surface on the observation surface side) of the second substrate 200 means equal to or greater than 90% and equal to or less than 100% of the area of the outer surface of the second substrate 200, and preferably equal to or greater than 95% and equal to or less than 100%.

The conductive layer 20 preferably includes a transparent conductive film, and is more preferably made of a transparent conductive film. A transparent conductive film is made of a transparent electrode material such as ITO.

The alignment mode of the present embodiment is a fringe field switching (FFS) mode, and displays a screen using a transverse electrical field. In the display panel 1 of the present embodiment, an aspect in which the pixel electrode 100PX provided with the slits 100PXS is arranged on the common electrode 100 CM having a planar shape with the third insulating film 150 interposed therebetween is described. However, the arrangement of the common electrode 100 CM and the pixel electrode 100PX may be switched. In this case, the common electrode 100 CM provided with the slits is arranged on the pixel electrode 100PX having a planar shape formed to occupy each pixel region, with the third insulating film 150 interposed between the common electrode 100 CM and the pixel electrode 100PX.

The alignment mode of the display panel 1 is not limited to the FFS mode. The alignment mode of the display panel 1 may be an in-plane switching (IPS) mode in which a screen is displayed using a transverse electrical field similarly to the FFS mode, for example. When the display panel 1 is in the IPS mode, the pixel electrode 100PX and the common electrode 100 CM included in the display panel 1 are each an interdigital electrode, and the pixel electrode 100PX, which is an interdigital electrode, and the common electrode 100 CM, which is an interdigital electrode, are provided on an identical electrode layer with the comb teeth are fitted to each other.

The alignment mode of the display panel 1 is not limited to the mode in which the screen is displayed using the transverse electrical field, and may be a vertical alignment (VA) mode in which the screen is displayed using a vertical electrical field, for example, or a twisted nematic (TN) mode. When the display panel 1 is in the VA mode or the TN mode, the first substrate 100 includes the pixel electrode 100PX having a planar shape formed to occupy each pixel region, and the second substrate 200 includes the common electrode 100 CM having a planar shape.

When the display panel 1 is in the VA mode, a perpendicular alignment film that aligns liquid crystal molecules substantially perpendicularly with respect to the film surface is used as the alignment film. The perpendicular alignment film has a function of aligning the liquid crystal molecules in the liquid crystal layer in the perpendicular direction with respect to the surface of the perpendicular alignment film in the pixel region at the time of no voltage application to the liquid crystal layer (when the voltage applied to the liquid crystal layer is less than the threshold voltage). Here, that the liquid crystal molecules are aligned in the perpendicular direction with respect to the surface of the perpendicular alignment film means that the pre-tilt angle of the liquid crystal molecules is equal to or greater than 86° and equal to or less than 90°, preferably equal to or greater than 87° and equal to or less than 89°, and more preferably equal to or greater than 87.5° and equal to or less than 89° with respect to the surface of the perpendicular alignment film. The pre-tilt angle of the liquid crystal molecules means an angle at which the major axis of the liquid crystal molecule is tilted with respect to the main surface of each substrate at the time of no voltage application to the liquid crystal layer.

Hereinafter, the first substrate 100 will be described in more detail.

As illustrated in FIG. 1, the first gate line 100G1 and the fourth gate line 100G4 are arranged on the one side DR11 of the first pixel electrode 100PX1 in the longitudinal direction DR1, and the second gate line 100G2 is arranged on the other side DR12 of the first pixel electrode 100PX1 in the longitudinal direction DR1.

Here, that the gate line is arranged on the one side DR11 of the first pixel electrode 100PX1 in the longitudinal direction DR1 means that the gate line is arranged on the one side DR11 of the first pixel electrode 100PX1 in the longitudinal direction DR1 and in a region not overlapping the first pixel electrode 100PX1 in plan view, or that the gate line overlaps an end portion region of the one side DR11 of the first pixel electrode 100PX1 in the longitudinal direction DR1 in plan view. The end portion region on the one side DR11 of the first pixel electrode 100PX1 in the longitudinal direction DR1 refers to a region having a length D/3 in the longitudinal direction DR1 from the end portion on the one side DR11 of the first pixel electrode 100PX1, where a length in the longitudinal direction DR1 of the first pixel electrode 100PX1 is a length D.

Similarly, that the gate line is arranged on the other side DR12 of the first pixel electrode 100PX1 in the longitudinal direction means that the gate line is arranged on the other side DR 12 of the first pixel electrode 100PX1 in the longitudinal direction DR1 and in a region not overlapping the first pixel electrode 100PX1 in plan view, or that the gate line overlaps an end portion region of the other side DR12 of the first pixel electrode 100PX1 in the longitudinal direction DR1 in plan view. The end portion region on the other side DR12 of the first pixel electrode 100PX1 in the longitudinal direction DR1 refers to a region having the length D/3 in the longitudinal direction DR1 from the end portion on the other side DR12 of the first pixel electrode 100PX1, where a length in the longitudinal direction DR1 of the first pixel electrode 100PX1 is the length D.

When the gate line is arranged on the one (or the other) side of the first pixel electrode 100PX1 in the longitudinal direction, the gate line needs not overlap the first pixel electrode 100PX1 in plan view, a part of the width in the longitudinal direction DR1 of the gate line may overlap the end portion region of the first pixel electrode 100PX1, or the entire width in the longitudinal direction DR1 of the gate line may overlap the end portion region of the first pixel electrode 100PX1.

It is preferable that at least one of the first gate line 100G1, the second gate line 100G2, and the fourth gate line 100G4 be arranged in a region not overlapping the first pixel electrode 100PX1 in plan view. Such aspect suppresses the liquid crystal capacitance Clc and the auxiliary capacitance Ccom1 from increasing, and can give a good display quality even with a shorter charging time. Furthermore, in a configuration in which another electrode is not interposed between the gate line and the first pixel electrode 100PX1, parasitic capacitance formed between the gate line and the pixel electrode can be reduced, and the deviation of the optimum counter voltage can be reduced.

In the liquid crystal display device, a positive polarity image signal and a negative polarity image signal are alternately written to each pixel electrode. When the switching element is brought into the on state (state where Vgh is input to the gate line) and each image signal is written, and then the switching element is changed to the off state (state where Vgl is input to the gate line), a potential of the pixel electrode fluctuates due to the parasitic capacitance formed between a gate electrode and a drain electrode of the switching element and parasitic capacitance formed between the gate line and the pixel electrode. At this time, if a potential difference (voltage) between the pixel electrode and the common electrode at the time of writing the positive polarity image signal is different from a potential difference (voltage) between the pixel electrode and the common electrode at the time of writing the negative polarity image signal, a display defect such as flicker may occur due to a difference between a voltage applied to the liquid crystal layer at the time of writing the positive polarity image signal and a voltage applied to the liquid crystal layer at the time of writing the negative polarity image signal. In order to prevent such voltage difference from increasing, the potentials of the image signal and the common electrode are adjusted in advance in consideration of the parasitic capacitance of each pixel, and the potential of the common electrode having the smallest voltage difference (ideally, 0 V) is called an optimum counter voltage. The optimum counter voltage fluctuates depending on the magnitude of the parasitic capacitance of each pixel (e.g., the parasitic capacitance formed between the gate line and the pixel electrode, the liquid crystal capacitance Clc, or the like) and the signal supplied to the gate line, and a difference (deviation) may occur between the ideal optimum counter voltage and the actual common electrode potential.

For example, the first gate line 100G1 and the fourth gate line 100G4 are arranged between the first pixel electrode 100PX1 and a pixel electrode 100PX1A adjacent to the one side DR11 in the longitudinal direction DR1 of the first pixel electrode 100PX1, and the second gate line 100G2 is arranged between the first pixel electrode 100PX1 and a pixel electrode 100PX1B adjacent to the other side DR12 in the longitudinal direction DR1 of the first pixel electrode 100PX1. Such aspect can effectively reduce the parasitic capacitance, and can effectively reduce the deviation of the optimum counter voltage. The liquid crystal capacitance Clc and the auxiliary capacitance Ccom1 are suppressed from increasing, and a good display quality can be obtained even with a shorter charging time. Here, that the gate line is arranged between two pixel electrodes means that the gate line does not overlap any of the two pixel electrodes in plan view.

It is also preferable that at least one of the first gate line 100G1 and the fourth gate line 100G4 overlap the end portion region of the one side DR11 in the longitudinal direction DR1 of the first pixel electrode 100PX1 in plan view. Such aspect can enhance the aperture ratio (reflectance in a case of a reflective display panel).

It is also preferable that the second gate line 100G2 overlap the end portion region of the other side DR12 in the longitudinal direction DR1 of the first pixel electrode 100PX1 in plan view. Such aspect can enhance the aperture ratio (reflectance in a case of a reflective display panel).

The third gate line 100G3 is arranged to overlap the first pixel electrode 100PX1 and the second pixel electrode 100PX2 between the first gate line 100G1 and the second gate line 100G2. It is preferable that the third gate line 100G3 be arranged apart from the first gate line 100G1, the second gate line 100G2, and the fourth gate line 100G4. Specifically, assuming that the length of the pixel electrode 100PX in the longitudinal direction DR1 is D, the distance between the third gate line 100G3 and the end portion of the pixel electrode 100PX in the longitudinal direction DR1 is preferably equal to or greater than D/3 and equal to or less than 2D/3. Such aspect avoids only any one of the first gate line 100G1, the second gate line 100G2, and the fourth gate line 100G4 from being greatly affected by the parasitic capacitance from the third gate line 100G3, and can give a good display quality.

It is preferable that the third gate line 100G3, the first switching element 100U1, and the second switching element 100U2 be arranged apart from the first gate line 100G1, the second gate line 100G2, and the fourth gate line 100G4, respectively. Specifically, assuming that the length of the pixel electrode 100PX in the longitudinal direction DR1 is D, the distance between each of the third gate line 100G3, the first switching element 100U1, and the second switching element 100U2 and the end portion of the pixel electrode 100PX in the longitudinal direction DR1 is preferably equal to or greater than D/3 and equal to or less than 2D/3. Such aspect avoids only any one of the first gate line 100G1, the second gate line 100G2, and the fourth gate line 100G4 from being greatly affected by the parasitic capacitance from the third gate line 100G3, the first switching element 100U1, and the second switching element 100U2, and can give a good display quality.

The common line 100C is arranged between the first pixel electrode 100PX1 and the second pixel electrode 100PX2. The common line 100C is preferably arranged such that the capacitance generated between the common line 100C and the first pixel electrode 100PX1 is substantially the same as the capacitance generated between the common line 100C and the second pixel electrode 100PX2. Specifically, the distance from the center line of the common line 100C to an edge portion in the lateral direction DR2 of the first pixel electrode 100PX1 is preferably the same as the distance from the center line of the common line 100C to an edge portion in the lateral direction DR2 of the second pixel electrode 100PX2. Furthermore, in consideration of an occurrence of a line width and positional deviation in the manufacturing process, it is preferable not to overlap the first pixel electrode 100PX1 and the second pixel electrode 100PX2.

The first data line 100S1 is arranged between the first pixel electrode 100PX1 and the pixel electrode 100PX11 adjacent on the side opposite to the second pixel electrode 100PX2 in the lateral direction DR2 with respect to the first pixel electrode 100PX1. It is preferable that the first data line 100S1 do not overlap the first pixel electrode 100PX1 and the pixel electrode 100PX11.

The second data line 100S2 is arranged between the second pixel electrode 100PX2 and the pixel electrode 100PX21 adjacent on the side opposite to the first pixel electrode 100PX1 in the lateral direction DR2 with respect to the second pixel electrode 100PX2. It is preferable that the second data line 100S2 do not overlap the second pixel electrode 100PX2 and the pixel electrode 100PX21.

As illustrated in FIG. 1, the display panel 1 (specifically, the first substrate 100) further includes the third switching element 100T1 connected to the first pixel electrode 100PX1, the first data line 100S1, and the first gate line 100G1, and the fourth switching element 100T2 connected to the second pixel electrode 100PX2, the second data line 100S2, and the second gate line 100G2.

The first switching element 100U1, the second switching element 100U2, the third switching element 100T1, and the fourth switching element 100T2 are thin film transistors (TFTs), for example.

In the display panel 1 of the present embodiment, the first pixel electrode 100PX1 is charged with the signal of the first data line 100S1 via the third switching element 100T1, and the potential difference (voltage) between the first pixel electrode 100PX1 and the common electrode 100 CM is applied to the liquid crystal molecules contained in the liquid crystal layer 300. Similarly, in the display panel 1 of the present embodiment, the second pixel electrode 100PX2 is charged with the signal of the second data line 100S2 via the fourth switching element 100T2, and the potential difference (voltage) between the second pixel electrode 100PX2 and the common electrode 100 CM is applied to the liquid crystal molecules contained in the liquid crystal layer 300. The first substrate 100 is also called a TFT substrate.

As illustrated in FIG. 5, the first switching element 100U1 and the second switching element 100U2 are three-terminal switch including a semiconductor layer 30A, a source electrode 30B that is a part of the corresponding common line 100C, a drain electrode 30C connected to the corresponding pixel electrode 100PX, and a gate electrode 30D that is a part of the corresponding the third gate line 100G3.

The third switching element 100T1 and the fourth switching element 100T2 are three-terminal switches including the semiconductor layer 30A, the source electrode 30B that is a part of the corresponding data line 100S, the drain electrode 30C connected to the corresponding pixel electrode 100PX, and the gate electrode 30D that is a part of the corresponding gate line 100G.

The first gate line 100G1, the second gate line 100G2, the third gate line 100G3, and the fourth gate line 100G4 are drawn from a drive circuit (gate driver monolithic (GDM) circuit) monolithically formed in a frame region 1NA provided on the first substrate 100 and around the display region 1AA. Specifically, as illustrated in FIG. 3, a first gate driver 10G1 that drives the first gate line 100G1, the second gate line 100G2, and the fourth gate line 100G4, and a second gate driver 10G2 that drives the third gate line 100G3 are included. The first gate driver 10G1 is arranged on one side DR21 (right side to the screen) in the lateral direction DR2, and the second gate driver 10G2 is arranged on an other side DR22 (left side to the screen) in the lateral direction DR2. Such aspect can equalize the frame size to that of the related art. The first gate driver 10G1 and the second gate driver 10G2 are formed of a drive circuit (gate driver monolithic (GDM) circuit) monolithically formed on the first substrate 100.

The display panel 1 includes the first gate driver 10G1 that drives the first gate line 100G1, the second gate line 100G2, and the fourth gate line 100G4, and the second gate driver 10G2 that drives the third gate line 100G3. In a first period within one frame period, the first gate driver 10G1 drives the first gate line 100G1, the second gate line 100G2, and the fourth gate line 100G4 from the topmost pixel row toward the bottommost pixel row in the display region, writes an image signal to the pixel 1P corresponding to an area of equal to or greater than ½ of an area of the display region 1AA. In a second period following the first period in the one frame period, the second gate driver 10G2 drives the third gate line 100G3 from the topmost pixel row toward the bottommost pixel row in the display region, and writes the ground signal or the common electrode signal to each pixel 1P. Such aspect enables black display to be effectively inserted, and can further suppress an afterimage.

The data line (source line) 100S is drawn out from an IC driver chip 10S. The IC driver chip 10S is provided in a terminal region 1NX of the first substrate 100 and is connected to a flexible printed circuit board terminal 10F. The terminal region 1NX is a part of the frame region 1NA positioned on the other side DR12 (lower side to the screen) in the longitudinal direction DR1 with respect to the display region.

The display panel 1 includes a common wiring line 100CML connected to the common electrode 100 CM. The common wiring line 100CML is arranged in the frame region 1NA to surround the display region 1AA. Specifically, the common wiring line 100CML is connected to the flexible printed circuit board terminal 10F, is provided in the gate wiring line layer 100GL or the data wiring line layer 100SL from the terminal region INX to the periphery of the display region 1AA (to the frame region 1NA), and is drawn out from here toward the display region 1AA.

One end of the flexible printed circuit board is connected to the flexible printed circuit board terminal 10F, and a circuit board is connected to the other end of the flexible printed circuit board. A signal for controlling the IC driver chip 10S, a common signal, and the like are supplied to the first substrate 100 from the circuit board via the flexible printed circuit board.

It is preferable that the common line 100C be connected to a ground wiring line to which a ground signal is supplied. That is, the common line 100C is preferably set to the ground potential. Such aspect enables black display to be effectively inserted, and can further suppress an afterimage.

It is also preferable that the common line 100C be connected with the common electrode 100 CM. That is, it is also preferable that the common line 100C be set to the same potential as the common electrode 100 CM. Such aspect enables black display to be effectively inserted, and can further suppress an afterimage.

The common line 100C is preferably a wiring line drawn out from the common wiring line 100CML provided in the frame region INA toward the display region 1AA. Such aspect enables the common line 100C to be set to the same potential as the common electrode 100 CM, enables black display to be effectively inserted, and can further suppress an afterimage.

It is preferable to appropriately select, according to the image signal to be input to the data line 100S, whether the signal to be input to the common line 100C is GND or a COM signal. For example, assume a case where the potential serving as a reference of amplitude of the image signal is GND, and the optimum counter voltage set based on the image signal is input as the COM signal. It is preferable that there be no difference between the optimum counter voltage set based on the image signal and the optimum counter voltage set based on the black signal. If the COM signal is input to the common line 100C, the optimum counter voltage set based on the black signal (COM signal) is deviated from the optimum counter voltage set based on the image signal by the potential fluctuation amount of the pixel electrode caused by the parasitic capacitance of each pixel. Specifically, a voltage deviated from the black display voltage (ideally, for example, 0 V) is applied to the liquid crystal layer. Therefore, inputting GND (0 V) to the common line 100C may be desirable.

On the other hand, when the potential serving as a reference of amplitude of the image signal is a potential greatly different from GND, for example, when the potential serving as a reference of amplitude of the image signal is on a positive polarity side (e.g., +5 V) with respect to GND, inputting the COM signal to the common line 100C may be desirable. When the COM signal is input to the common line 100C, deviation of the optimum counter voltage occurs, but the magnitude of the deviation is smaller than that when GND (0 V) is input, and in some cases, a voltage closer to the black voltage can be applied to the liquid crystal layer. This common line 100C can also be used as a wiring line for reducing resistance distribution within the display region 1AA of the common electrode 100 CM.

Signals other than GND and the common signal may be input to the common line 100C. For example, when the third gate line 100G3 changes from Vgh to Vgl, the pixel electrode potential fluctuates due to gate-drain capacitance or the like of the transistors (the first switching element 100U1 and the second switching element 100U2), but a signal in consideration of the fluctuation amount may be input. In this case, an additional signal to be input to the common line 100C and a drawing line thereof are necessary, but there is an advantage that the deviation from the optimum counter voltage can be further reduced.

By bringing the third gate line 100G3 into a state of not being scanned (low signal (Vgl) remains input), writing of a black image can be eliminated.

The first switching element 100U1 and the second switching element 100U2 are preferably arranged adjacent to each other, and are more preferably arranged adjacent to each other in the lateral direction DR2 via the common line 100C. Such aspect can reduce the size of a black matrix necessary for light shielding of the transistor and can suppress a decrease in the aperture ratio as compared with a case where the first switching element 100U1 and the second switching element 100U2 are arranged apart from each other.

The sizes of the first switching element 100U1 and the second switching element 100U2 (length of a channel width W in a case where channel lengths L are the same) are substantially the same as those of the third switching element 100T1 and the fourth switching element 100T2, or can be made smaller than those of the third switching element 100T1 and the fourth switching element 100T2.

That is, when the channel lengths L of the first switching element 100U1 and the third switching element 100T1 are the same, the length of the channel width W of the first switching element 100U1 can be made equal to or less than the length of the channel width W of the third switching element 100T1. When the channel lengths L of the second switching element 100U2 and the fourth switching element 100T2 are the same, the length of the channel width W of the second switching element 100U2 can be made equal to or less than the length of the channel width W of the fourth switching element 100T2.

In the dual-gate structure, two gate lines (the first gate line 100G1 and the second gate line 100G2) are used for image signal writing in a certain pixel row, and the timing points at which these two gate lines become Vgl need to be made at least different. Here, since one third gate line 100G3 of the present embodiment controls writing to all the pixels 1P in one pixel row, a Vgh period of the third gate line 100G3 can be secured by the total length of the Vgh period of the first gate line 100G1 and the Vgh period of the second gate line 100G2. Therefore, the first switching element 100U1 and the second switching element 100U2 can be made smaller than the third switching element 100T1 and the fourth switching element 100T2, respectively.

Specifically, the area of the first switching element 100U1 in plan view and the area of the second switching element 100U2 in plan view are preferably equal to or less than the area of the third switching element 100T1 in plan view and the area of the fourth switching element 100T2 in plan view, respectively.

The area of the first switching element 100U1 in plan view and the area of the second switching element 100U2 in plan view are more preferably smaller than the area of the third switching element 100T1 in plan view and the area of the fourth switching element 100T2 in plan view, respectively.

The channel width of the first switching element 100U1 and the channel width of the second switching element 100U2 are preferably equal to or less than the channel width of the third switching element 100T1 and the channel width of the fourth switching element 100T2, respectively.

The channel width of the first switching element 100U1 and the channel width of the second switching element 100U2 are more preferably smaller than the channel width of the third switching element 100T1 and the channel width of the fourth switching element 100T2, respectively.

Figure 6:
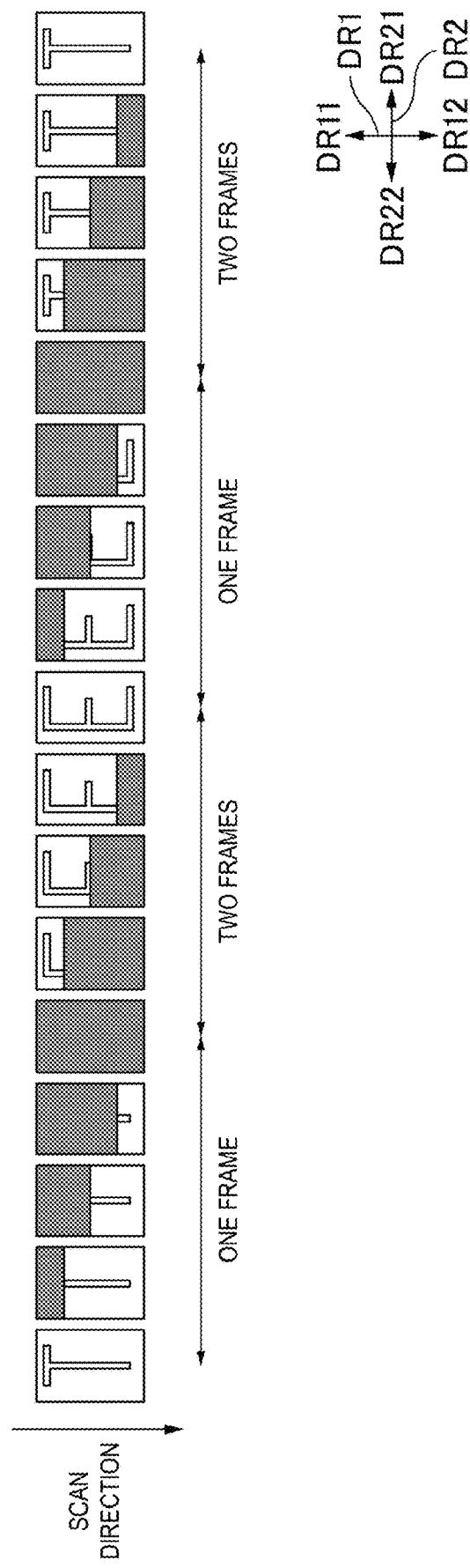
FIG. 6 is a view illustrating a display method of a display panel having a known dual-gate structure.
Figure 7:
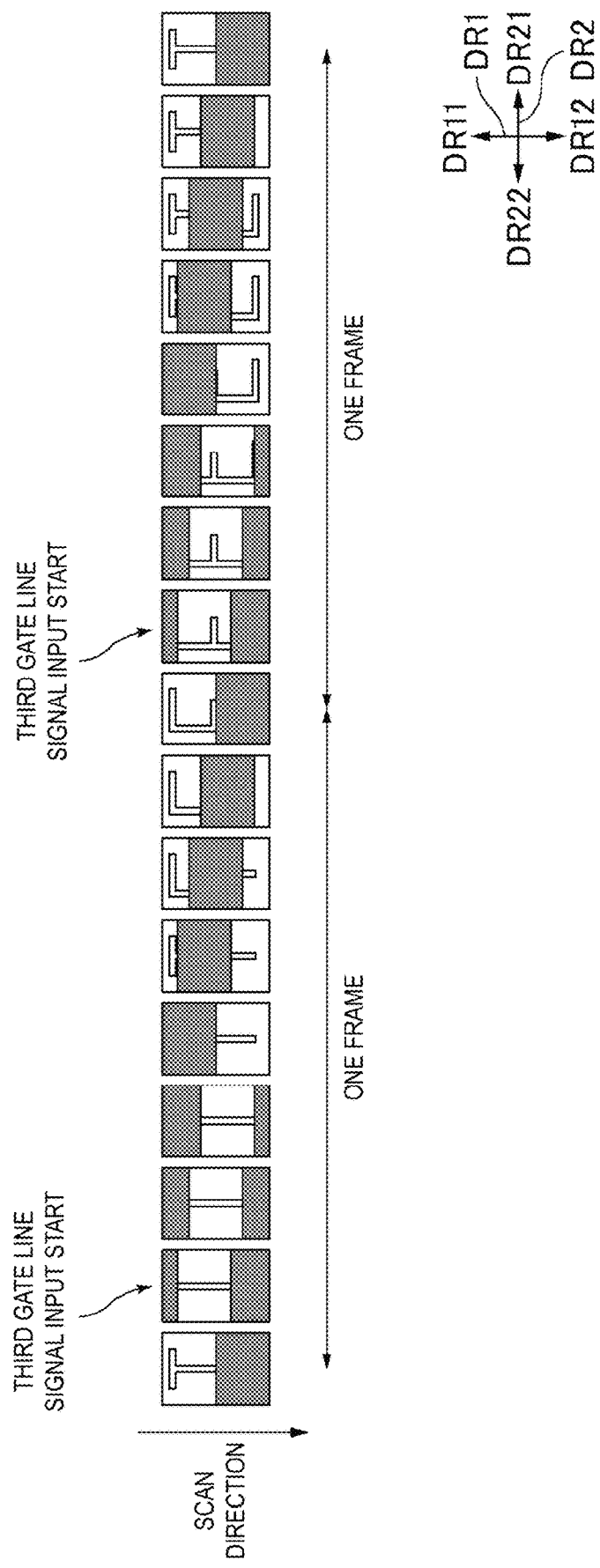
FIG. 7 is a view illustrating a display method of the display panel of the first embodiment.
Figure 16:
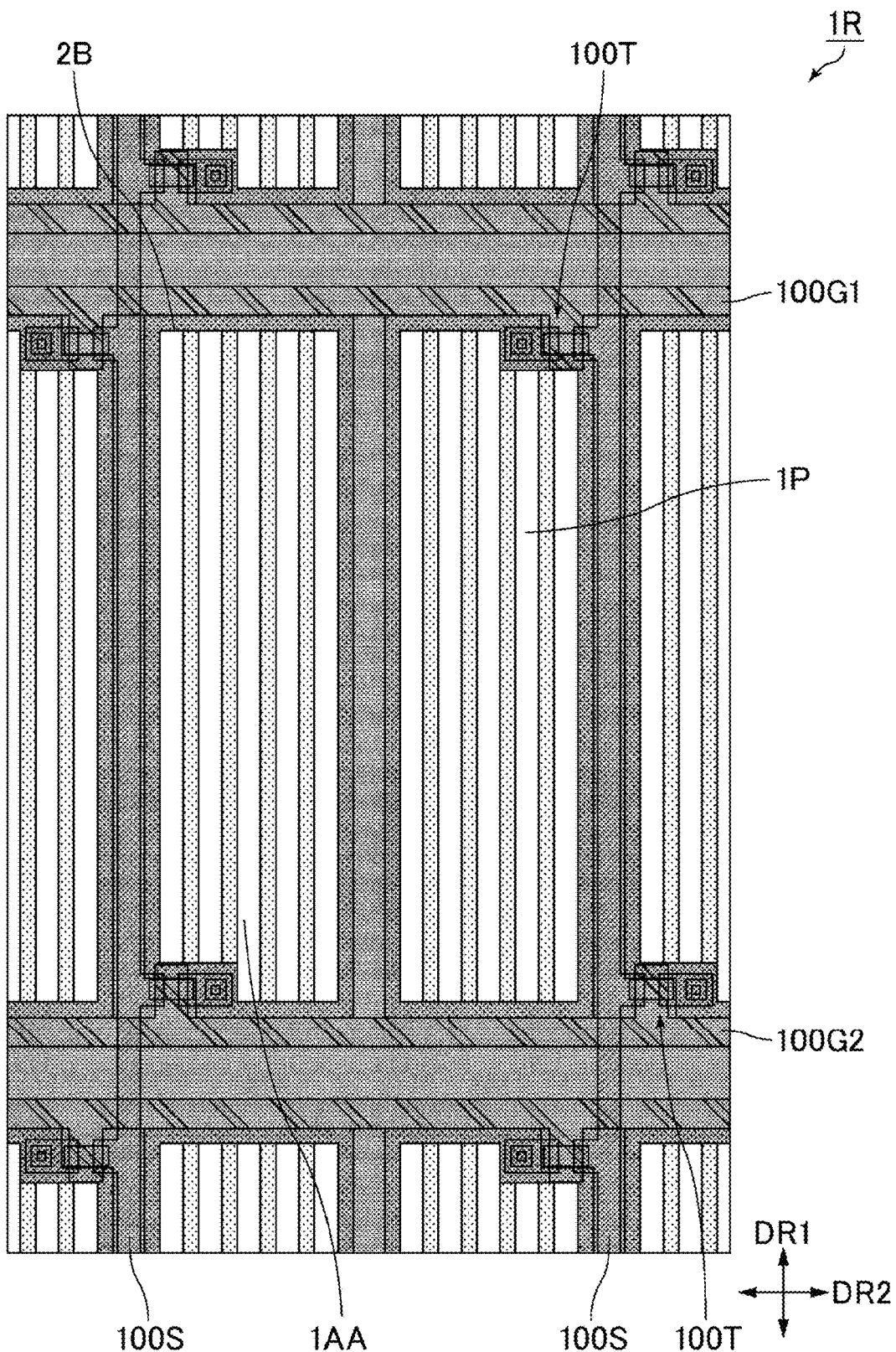
FIG. 16 is a schematic plan view illustrating an example of a display panel having a dual-gate structure.

FIG. 6 is a view illustrating a display method of a display panel having a known dual-gate structure. Examples of the known dual-gate structure include the structure illustrated in FIG. 16. FIG. 7 is a view illustrating the display method of the display panel of the first embodiment. As illustrated in FIG. 6, the display panel having the known dual-gate structure repeats image display and black display for each frame. That is, after the image display is written into the pixel 1P of each pixel row sequentially from the topmost pixel row to the bottommost pixel row in the display region, the black signal is written into the pixel 1P of each pixel row sequentially from the topmost pixel row to the bottommost pixel row in the display region, thereafter the image display is written again sequentially from the topmost pixel row to the bottommost pixel row in the display region, and this is repeated hereinafter.

On the other hand, in the display panel 1 of the present embodiment, for example, as illustrated in FIG. 7, the image display is written sequentially from the topmost pixel row of the display region, and after the end of writing of the image signal to pixels corresponding to the area equal to or greater than ½ of an area of the display region, the black signal is written sequentially from the topmost pixel row to the bottommost pixel row of the display region. Furthermore, the same signal (GND signal or COM signal) having a constant potential is continuously written using the third gate line 100G3 to the pixel IP in a certain pixel row and the pixel 1P in a pixel row adjacent to the certain pixel row, whereby a black screen can be inserted. In the display panel 1 of the present embodiment, after an image signal of a certain frame is written into the pixel 1P of a certain pixel row, the black writing is performed, and then an image signal of a next frame is written, and therefore, the thin film transistor 100T can be made smaller than that in a display method in which black writing is not performed for each frame.

Examples of the insertion method of the black screen include a method of inserting the black screen without overlapping the timing points of Vgh of two third gate lines adjacent to each other (FIGS. 8A to 8I), a method of inserting the black screen with overlapping the timing points of Vgh of two third gate lines adjacent to each other (FIGS. 9A to 9I), and a method of inserting the black screen by simultaneously driving two third gate lines adjacent to each other (FIGS. 10A to 10I). The signs + and − described in FIGS. 8A to 8I to FIGS. 10A to 10I indicate the polarities of the signals written in the respective pixels, and FIGS. 8A to 8I to FIGS. 10A to 10I each illustrate an example of column inversion driving in which the polarities are different for each column. FIGS. 8A to 8I are schematic views illustrating a case where timing points of Vgh of two third gate lines adjacent to each other are not overlapped in the display panel of the first embodiment.

Figure 8A:
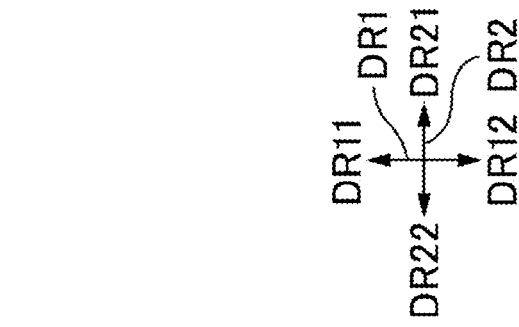
FIGS. 8A to 8I are schematic views illustrating a case where timing points of Vgh of two third gate lines adjacent to each other are not overlapped in the display panel of the first embodiment.
Figure 8A:
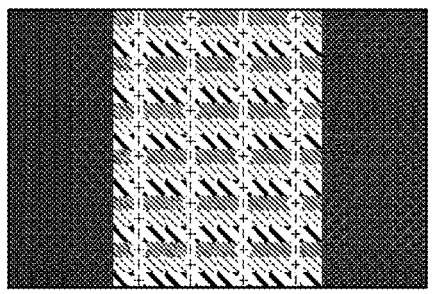

FIG. 8A illustrates a state in which an image signal is written in a pixel corresponding to a region from the top to a half of the display region 1AA in a certain frame. A pixel corresponding to a lower region from a half of the display region 1AA is in a state of holding a black signal written in a previous frame of the certain frame.

Figure 8B:
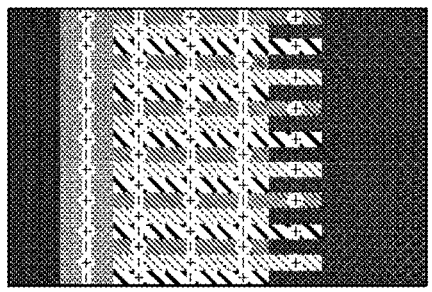

FIG. 8B illustrates a state in which the image signal is written by the first gate line 100G1 to the pixel corresponding to the first gate line 100G1 in the topmost pixel row in the region (lower region from the half of the display region 1AA of (1)) where the black signal is held. At this time, the third gate line 100G3 corresponding to the topmost pixel row in the display region 1AA changes from Vgl to Vgh, and the black signal is written in all the pixels corresponding to the topmost pixel row in the display region 1AA. However, at a time point when the writing of the image signal by the first gate line 100G1 is completed (time point when the first gate line 100G1 changes from Vgh to Vgl), the writing of the black signal by the third gate line 100G3 is not completed (third gate line 100G3 remains Vgh).

Figure 8C:
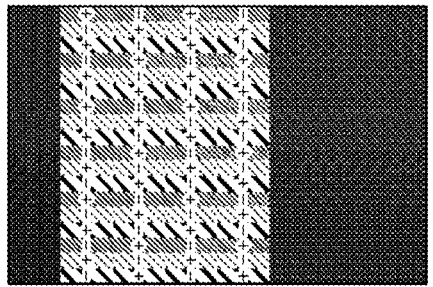

FIG. 8C illustrates a state in which the image signal is written by the second gate line 100G2 to the pixel corresponding to the second gate line 100G2 in the pixel row in which the image signal is written in (2). At this time, the third gate line 100G3 changes from Vgh to Vgl, and the writing of the black signal by the third gate line 100G3 is completed for all the pixels corresponding to the topmost pixel row in the display region 1AA.

Figure 8D:
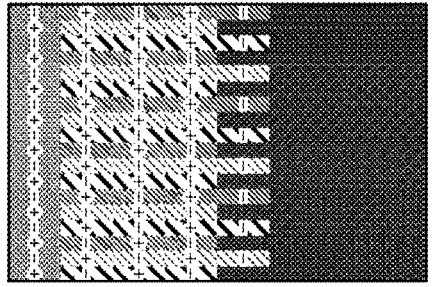

FIG. 8D illustrates a state in which the image signal is written by the first gate line 100G1 to the pixel corresponding to the first gate line 100G1 in the topmost pixel row in the region where the black signal is held below the half of the display region 1AA in (3). At this time, the third gate line 100G3 corresponding to the second top pixel row of the display region 1AA changes from Vgl to Vgh, and the black signal is written in all the pixels corresponding to the second top pixel row of the display region 1AA. However, at a time point when the writing of the image signal by the first gate line 100G1 is completed (time point when the first gate line 100G1 changes from Vgh to Vgl), the writing of the black signal by the third gate line 100G3 is not completed (third gate line 100G3 remains Vgh).

Figure 8E:
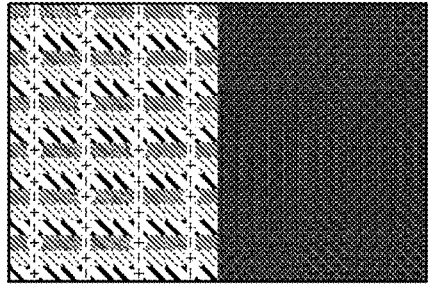
Figure 8F:
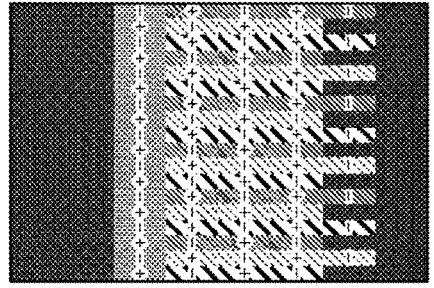
Figure 8G:
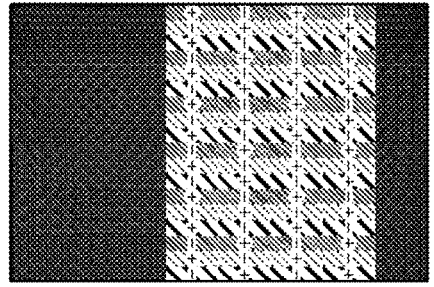
Figure 8H:
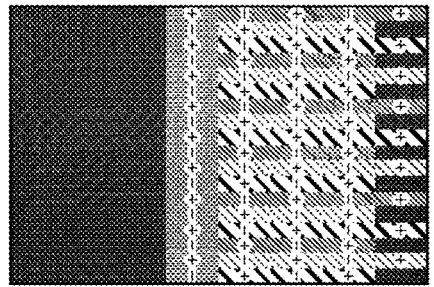
Figure 8I:
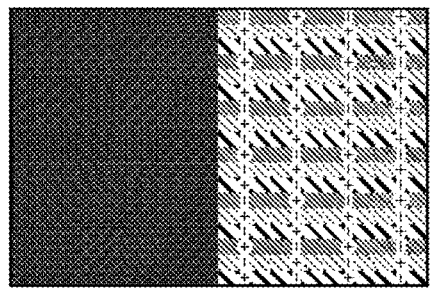

FIG. 8E illustrates a state in which the image signal is written by the second gate line 100G2 to the pixel corresponding to the second gate line 100G2 in the pixel row in which the image signal is written in (4). At this time, the third gate line 100G3 changes from Vgh to Vgl, and the writing of the black signal by the third gate line 100G3 is completed for all the pixels corresponding to the second top pixel row of the display region 1AA. Thereafter, similar repetition is performed.

That is, as illustrated in FIGS. 2, 3, and FIGS. 8A to 8I, a fifth gate line 100G5 extending in the lateral direction DR2 and overlapping the pixel electrode 100PX1A adjacent on the one side DR11 in the longitudinal direction DR1 of the first pixel electrode 100PX1; the first gate driver 10G1 that drives the first gate line 100G1, the second gate line 100G2, and the fourth gate line 100G4; and the second gate driver 10G2 that drives the third gate line 100G3 and the fifth gate line 100G5 are included. The period in which a signal input from the second gate driver 10G2 to the third gate line 100G3 has a high potential and the period in which a signal input from the second gate driver 10G2 to the fifth gate line 100G5 has a high potential do not overlap each other.

For the writing time when the black signal is written to all the pixels in a certain pixel row, it is possible to secure the time in which the writing time for the pixel signal to the pixel corresponding to the first gate line 100G1 and the writing time for the pixel signal to the pixel corresponding to the second gate line 100G2 in a pixel row different from a certain pixel are added, and therefore the sizes of the first switching element 100U1 and the second switching element 100U2 can be made smaller than those of the third switching element 100T1 and the fourth switching element 100T2.

FIGS. 9A to 9I are schematic views illustrating a case where timing points of Vgh of two third gate lines adjacent to each other are overlapped.

Figure 9A:
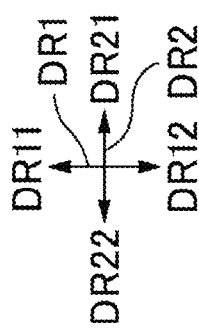
Figure 9A:
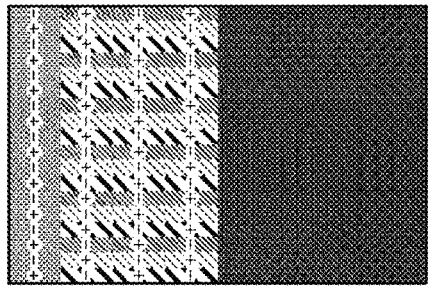

FIG. 9A illustrates a state in which the image signal is written in the pixel corresponding to the region from the second top pixel row to the half from the top of the display region 1AA in a certain frame. A pixel corresponding to a lower region from a half of the display region 1AA is in a state of holding a black signal written in a previous frame of the certain frame. Furthermore, the third gate line 100G3 corresponding to the topmost pixel row in the display region 1AA is Vgh, and the black signal is written in all the pixels corresponding to the topmost pixel row in the display region 1AA. However, at this time point, the writing of the black signal by the third gate line 100G3 is not completed (third gate line 100G3 remains Vgh).

Figure 9B:
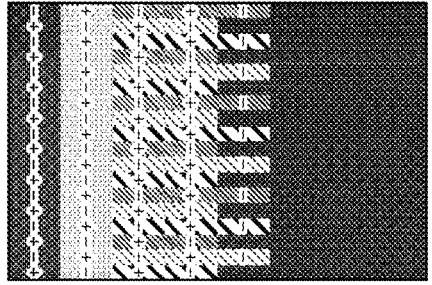

FIG. 9B illustrates a state in which the image signal is written by the first gate line 100G1 to the pixel corresponding to the first gate line 100G1 in the topmost pixel row in the region where the black signal is held (lower region from the half of the display region 1AA of (1)). At this time, the third gate line 100G3 corresponding to the second top pixel row of the display region 1AA changes from Vgl to Vgh, and the black signal is written in all the pixels corresponding to the second top pixel row of the display region 1AA. At the time point when the writing of the image signal by the first gate line 100G1 is completed (time point when the first gate line 100G1 changes from Vgh to Vgl), the writing of the black signal by the third gate line 100G3 corresponding to the topmost pixel row of the display region 1AA and the third gate line 100G3 corresponding to the second top pixel row of the display region 1AA is not completed (the third gate lines 100G3 each remain Vgh).

Figure 9C:
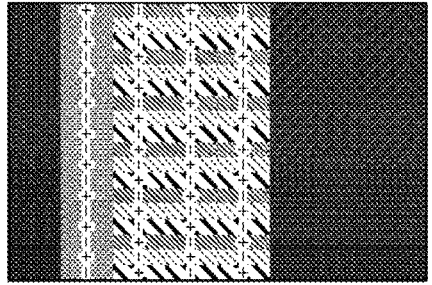

FIG. 9C illustrates a state in which the image signal is written by the second gate line 100G2 to the pixel corresponding to the second gate line 100G2 in the pixel row in which the image signal is written in (2). At this time, the third gate line 100G3 corresponding to the topmost pixel row in the display region 1AA changes from Vgh to Vgl, and the writing of the black signal by the third gate line 100G3 is completed for all the pixels corresponding to the topmost pixel row in the display region 1AA, but the writing of the black signal by the third gate line 100G3 corresponding to the second top pixel row of the display region 1AA is not completed.

Figure 9D:
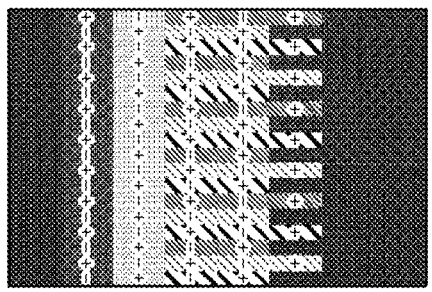

FIG. 9D illustrates a state in which the image signal is written by the first gate line 100G1 to the pixel corresponding to the first gate line 100G1 in the topmost pixel row in the region where the black signal is held below the half of the display region 1AA in (3). At this time, the third gate line 100G3 corresponding to the third top pixel row of the display region 1AA changes from Vgl to Vgh, and the black signal is written in all the pixels corresponding to the third top pixel row of the display region 1AA. At the time point when the writing of the image signal by the first gate line 100G1 is completed (time point when the first gate line 100G1 changes from Vgh to Vgl), the writing of the black signal by the third gate line 100G3 corresponding to the second top pixel row of the display region 1AA and the third gate line 100G3 corresponding to the third top pixel row of the display region 1AA is not completed (the third gate lines 100G3 each remain Vgh).

Figure 9E:
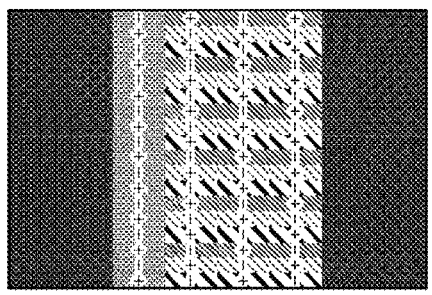
Figure 9F:
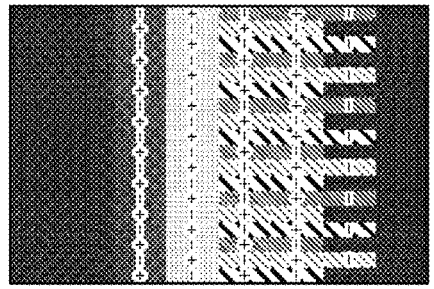
Figure 9G:
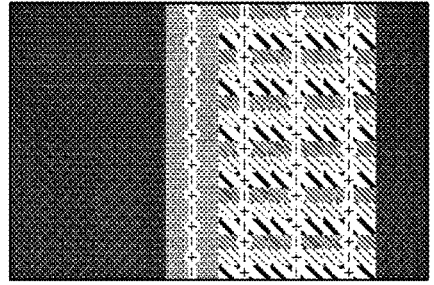

FIG. 9E illustrates a state in which the image signal is written by the second gate line 100G2 to the pixel corresponding to the second gate line 100G2 in the pixel row in which the image signal is written in (4). At this time, the third gate line 100G3 corresponding to the second top pixel row of the display region 1AA changes from Vgh to Vgl, and the writing of the black signal by the third gate line 100G3 is completed for all the pixels corresponding to the second top pixel row of the display region 1AA. However, the writing of the black signal by the third gate line 100G3 corresponding to the third top pixel row of the display region 1AA is not completed. Thereafter, similar repetition is performed.

That is, the fifth gate line 100G5 extending in the lateral direction DR2 and overlapping the pixel electrode 100PX1A adjacent on the one side DR11 in the longitudinal direction DR1 of the first pixel electrode 100PX1; the first gate driver 10G1 that drives the first gate line 100G1, the second gate line 100G2, and the fourth gate line 100G4; and the second gate driver 10G2 that drives the third gate line 100G3 and the fifth gate line 100G5 are included. The period in which a signal input from the second gate driver 10G2 to the third gate line 100G3 has a high potential and the period in which a signal input from the second gate driver 10G2 to the fifth gate line 100G5 has a high potential overlap each other in at least some period.

For the writing time when the black signal is written to all the pixels in a certain pixel row, it is possible to secure the time in which the writing time for the pixel signal to the pixel corresponding to the first gate line 100G1 and the writing time for the pixel signal to the pixel corresponding to the second gate line 100G2 in pixel rows different from a certain pixel that are two pixel rows adjacent to each other. Since the period in which the black signal is written in all the pixels of a certain pixel row and the period in which the black signal is written in all the pixels of the pixel row adjacent to the certain pixel row overlap each other in at least some period, the sizes of the first switching element 100U1 and the second switching element 100U2 can be made further smaller than those of the third switching element 100T1 and the fourth switching element 100T2 as compared with the case of FIGS. 8A to 8I.

FIGS. 10A to 10I are schematic views illustrating a case where two third gate lines adjacent to each other are simultaneously driven.

FIG. 10A illustrates a state in which an image signal is written in a pixel corresponding to a region from the top to a half of the display region 1AA in a certain frame. A pixel corresponding to a lower region from a half of the display region 1AA is in a state of holding a black signal written in a previous frame of the certain frame.

FIG. 10B illustrates a state in which the image signal is written by the first gate line 100G1 to the pixel corresponding to the first gate line 100G1 in the topmost pixel row in the region where the black signal is held (lower region from the half of the display region 1AA of (1)). At this time, the third gate line 100G3 corresponding to the topmost pixel row of the display region 1AA and the third gate line 100G3 corresponding to the second top pixel row of the display region 1AA simultaneously change from Vgl to Vgh, and the black signal is written to all the pixels corresponding to the topmost pixel row and the second pixel row of the display region 1AA. However, at the time point when the writing of the image signal by the first gate line 100G1 is completed (time point when the first gate line 100G1 changes from Vgh to Vgl), the writing of the black signal by the third gate line 100G3 corresponding to the topmost pixel row of the display region 1AA and the third gate line 100G3 corresponding to the second top pixel row of the display region 1AA is not completed (the third gate lines 100G3 each remain Vgh).

FIG. 10C illustrates a state in which the image signal is written by the second gate line 100G2 to the pixel corresponding to the second gate line 100G2 in the pixel row in which the image signal is written in (2). Also at this time, the writing of the black signal by the third gate line 100G3 corresponding to the topmost pixel row of the display region 1AA and the third gate line 100G3 corresponding to the second top pixel row of the display region 1AA is not completed (the third gate lines 100G3 each remain Vgh).

FIG. 10D illustrates a state in which the image signal is written by the first gate line 100G1 to the pixel corresponding to the first gate line 100G1 in the topmost pixel row in the region where the black signal is held below the half of the display region 1AA in (3). Also at this time, the writing of the black signal by the third gate line 100G3 corresponding to the topmost pixel row of the display region 1AA and the third gate line 100G3 corresponding to the second top pixel row of the display region 1AA is not completed (the third gate lines 100G3 each remain Vgh).

FIG. 10E illustrates a state in which the image signal is written by the second gate line 100G2 to the pixel corresponding to the second gate line 100G2 in the pixel row in which the image signal is written in (4). At this time, the third gate line 100G3 corresponding to the topmost pixel row of the display region 1AA and the third gate line 100G3 corresponding to the second top pixel row of the display region 1AA simultaneously change from Vgh to Vgl, and the writing of the black signal by the third gate line 100G3 is completed for all the pixels corresponding to the topmost pixel row and the second pixel row of the display region 1AA. Thereafter, this repetition is performed.

That is, the signal input to the third gate line 100G3 and the signal input to the fifth gate line 100G5 are the same signal.

For the writing time when the black signal is written to all the pixels in a certain pixel row and a pixel row adjacent to the certain pixel row, it is possible to secure the time in which the writing time for the pixel signal to the pixel corresponding to the first gate line 100G1 in two pixel rows adjacent to each other that are pixel rows different from the certain pixel row and the pixel row adjacent to the certain pixel row, and the writing time for the pixel signal with respect to the pixel corresponding to the second gate line 100G2 and the pixels by the first gate line 100G1 and the second gate line 100G2 therebelow are added. Therefore, as compared with the case of FIGS. 9A to 9I, the sizes of the first switching element 100U1 and the second switching element 100U2 can be made further smaller than those of the third switching element 100T1 and the fourth switching element 100T2. As illustrated in FIGS. 10A to 10I, when the plurality of third gate lines 100G3 (e.g., two adjacent third gate lines 100G3) are driven at the same timing point, the plurality of third gate lines 100G3 may be connected to one another.

Figure 11:
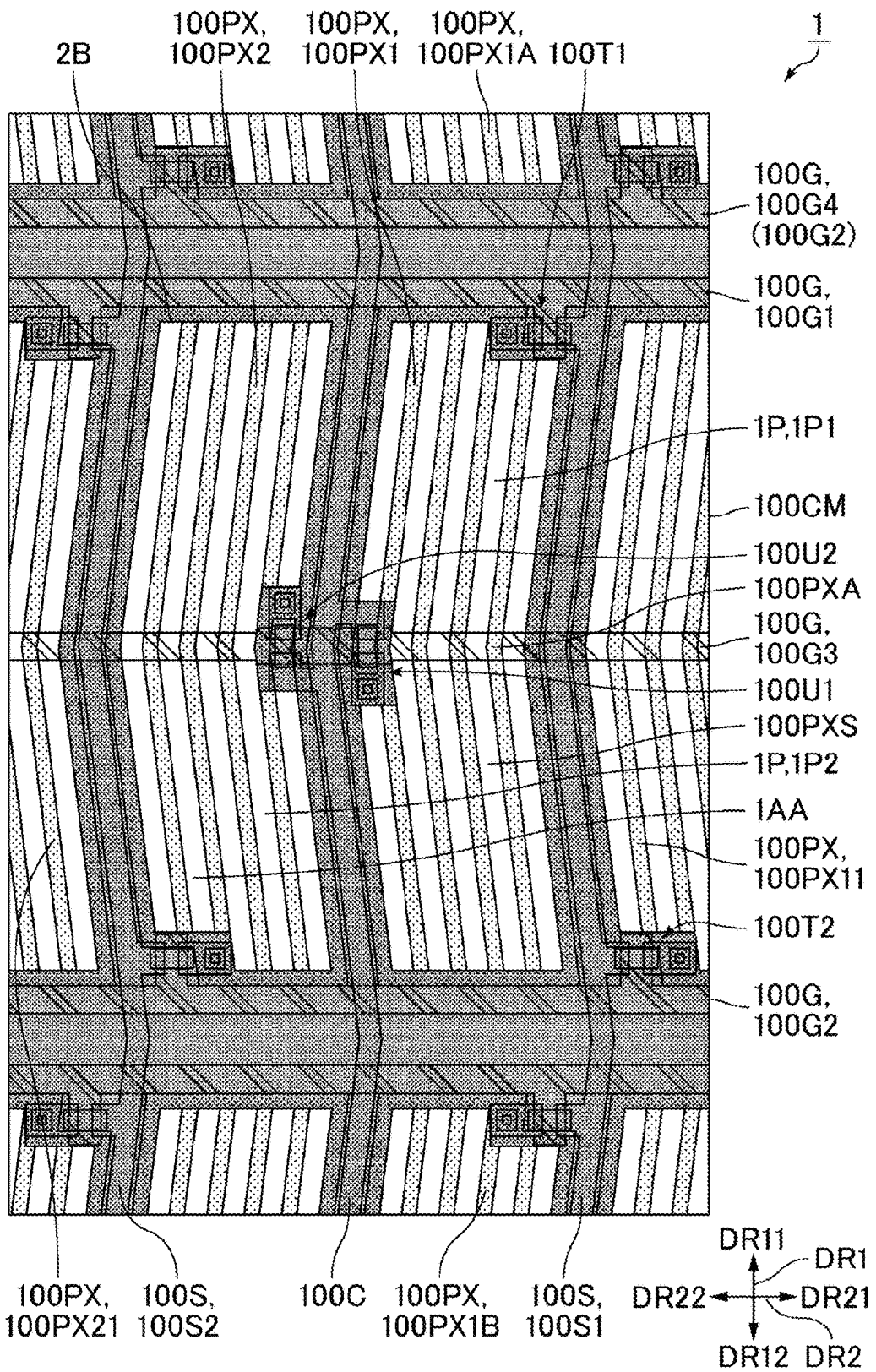
FIG. 11 is a schematic plan view illustrating an example of a pattern of a pixel electrode included in the display panel of the first embodiment.

FIG. 11 is a schematic plan view illustrating an example of a pattern of a pixel electrode included in the display panel of the first embodiment. FIG. 11 illustrates an example of the electrode structure of the display panel of the present embodiment that is the FFS mode.

At least one of the first pixel electrode 100PX1 and the common electrode 100 CM (the first pixel electrode 100PX1 in the present embodiment) includes the slit 100PXS including a bent portion 100PXA. Such aspect can change the alignment direction of the liquid crystal molecules in the region (bent portion 100PXA), and can improve a viewing angle characteristic (suppress a difference in the appearance of the screen from all azimuths). By forming the pattern of the data line 100S into the similar shape to that of the pixel 1P, a decrease in the aperture ratio can be suppressed.

In plan view, the third gate line 100G3 overlaps the bent portion 100PXA. The bent portion 100PXA serves as a boundary of a region in which the alignment direction of the liquid crystal molecules is different, and therefore the bent portion 100PXA is dark as compared with another region. By arranging the third gate line 100G3 here, the transmittance is reduced as compared with a case without the third gate line 100G3, but the reduction width can be further reduced.

In plan view, the first switching element 100U1 and the second switching element 100U2 overlap the bent portion 100PXA. The bent portion 100PXA serves as a boundary of a region in which the alignment direction of the liquid crystal molecules is different, and therefore the bent portion 100PXA is dark as compared with another region. By arranging the first switching element 100U1 and the second switching element 100U2 here, the transmittance is reduced as compared with a case without the first switching element 100U1 and the second switching element 100U2, but the reduction width can be further reduced.

Second Embodiment

In the present embodiment, features unique to the present embodiment will be mainly described, and a description of contents overlapping the above-described first embodiment will be omitted. The present embodiment is substantially the same as the first embodiment except that the common electrode and the common line are coupled in a predetermined region.

Figure 12:
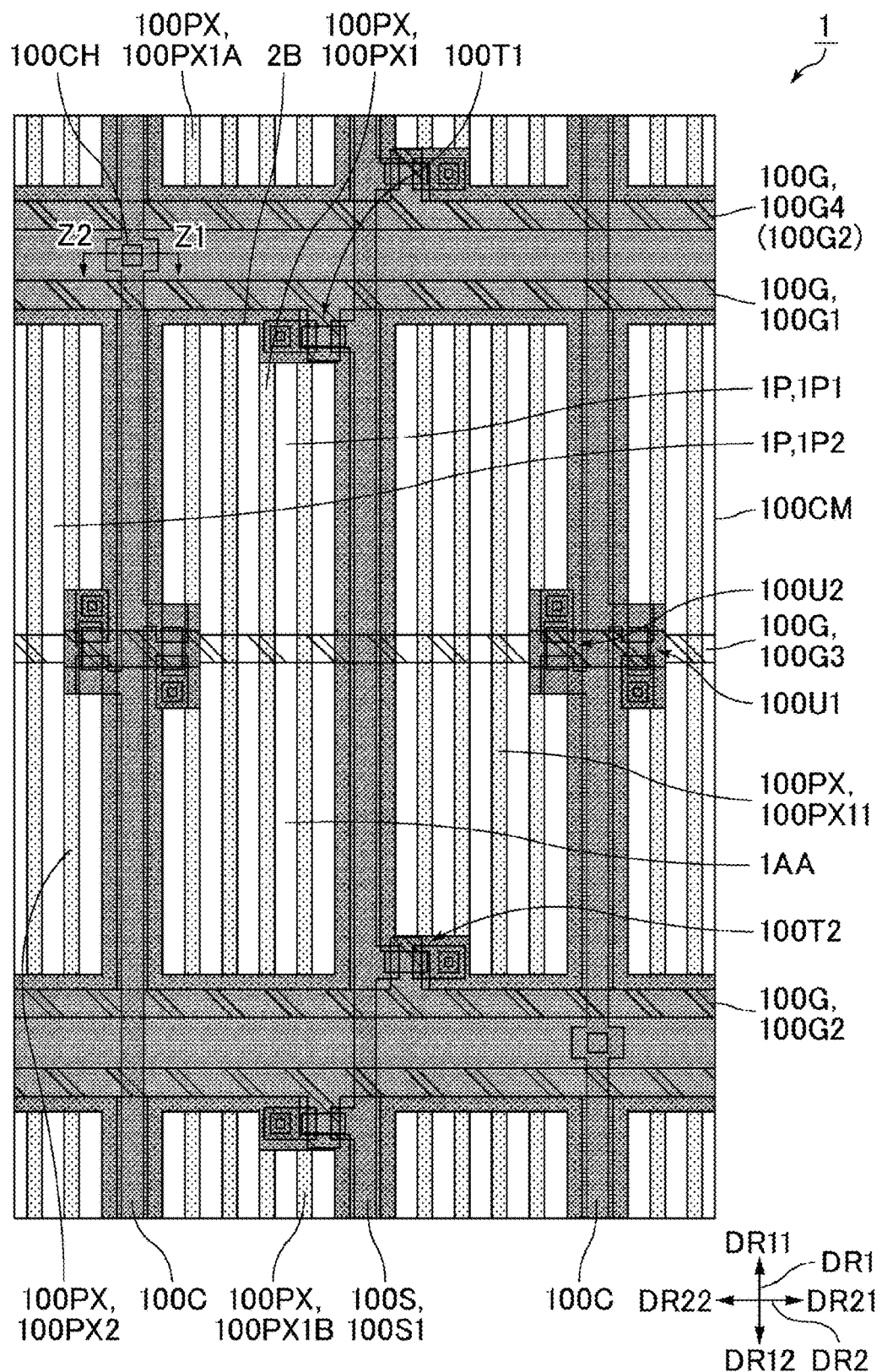
FIG. 12 is a schematic plan view of a display panel of a second embodiment.
Figure 13:
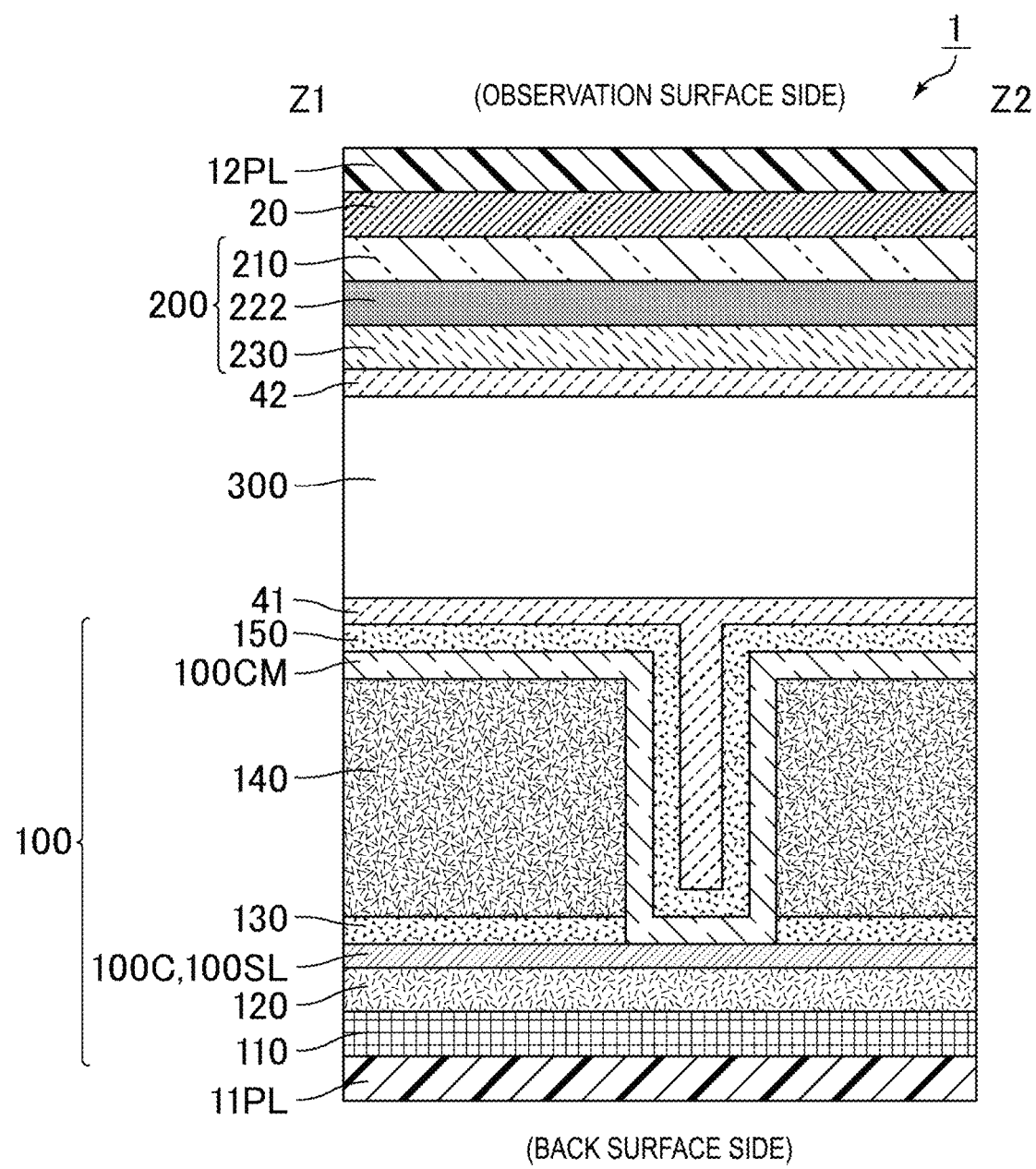
FIG. 13 is a schematic cross-sectional view of the display panel of the second embodiment taken along line Z1-Z2 in FIG. 12.

FIG. 12 is a schematic plan view of a display panel of the second embodiment. FIG. 13 is a schematic cross-sectional view of the display panel of the second embodiment taken along line Z1-Z2 in FIG. 12. As illustrated in FIGS. 12 and 13, the display panel 1 of the present embodiment includes a contact hole 100CH to which the common line 100C and the common electrode 100 CM are connected between the first gate line 100G1 and the fourth gate line 100G4 arranged between the pixel electrodes adjacent in the longitudinal direction DR1 (e.g., the pixel electrode 100PX1 and the pixel electrode 100PX1A). Such aspect enables a signal to be input to the common line 100C to be a common electrode signal. The contact hole 100CH is included between the first gate line 100G1 and the fourth gate line 100G4, whereby delay of the common electrode signal can be suppressed, and the display quality is improved.

Third Embodiment

In the present embodiment, features unique to the present embodiment will be mainly described, and a description of contents overlapping the above-described first embodiment will be omitted. The present embodiment is substantially the same as the first embodiment except that a touch sensor is built in.

Figure 14:
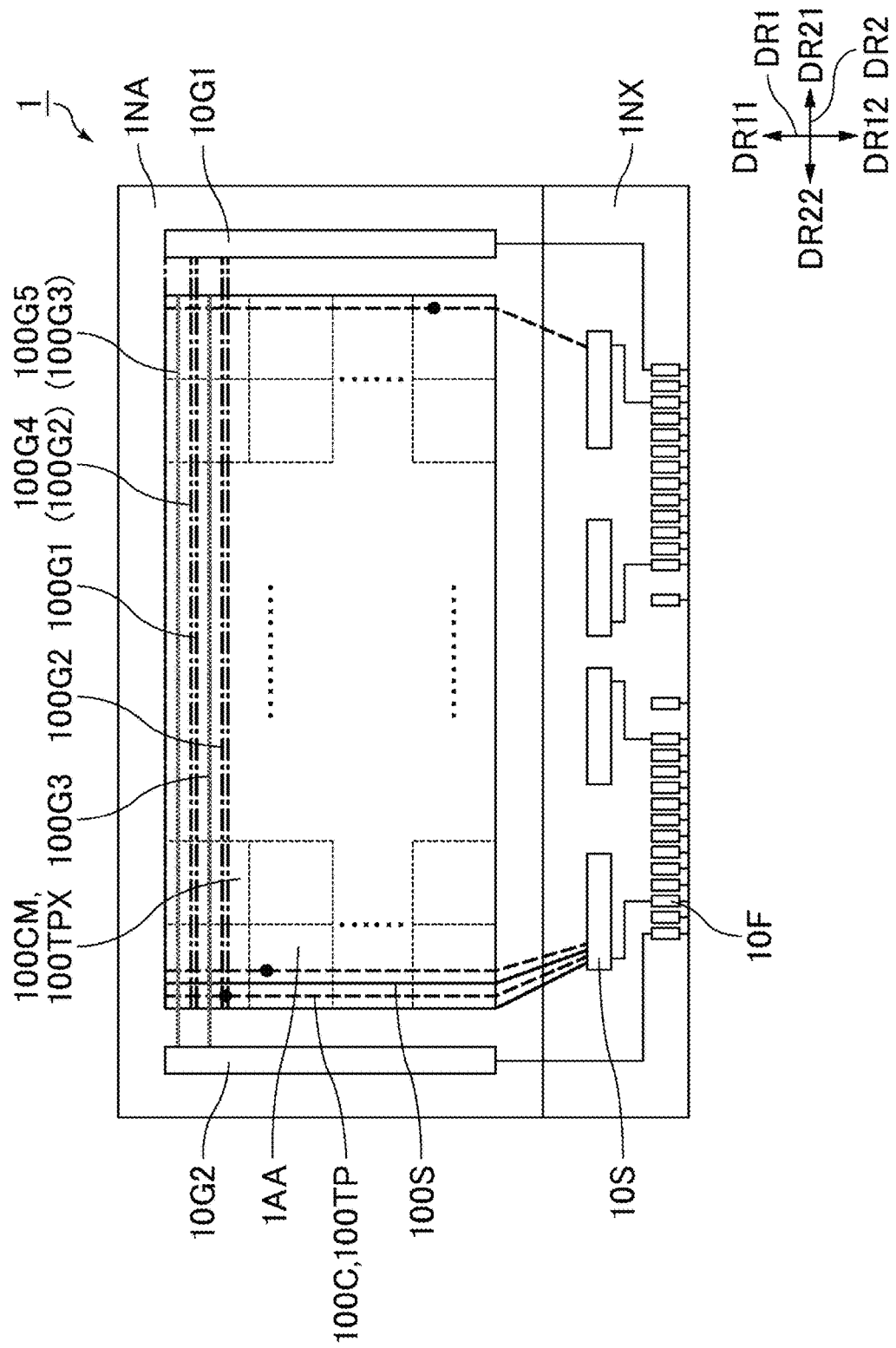
FIG. 14 is an example of a schematic plan view illustrating an entire display panel of a third embodiment.
Figure 15:
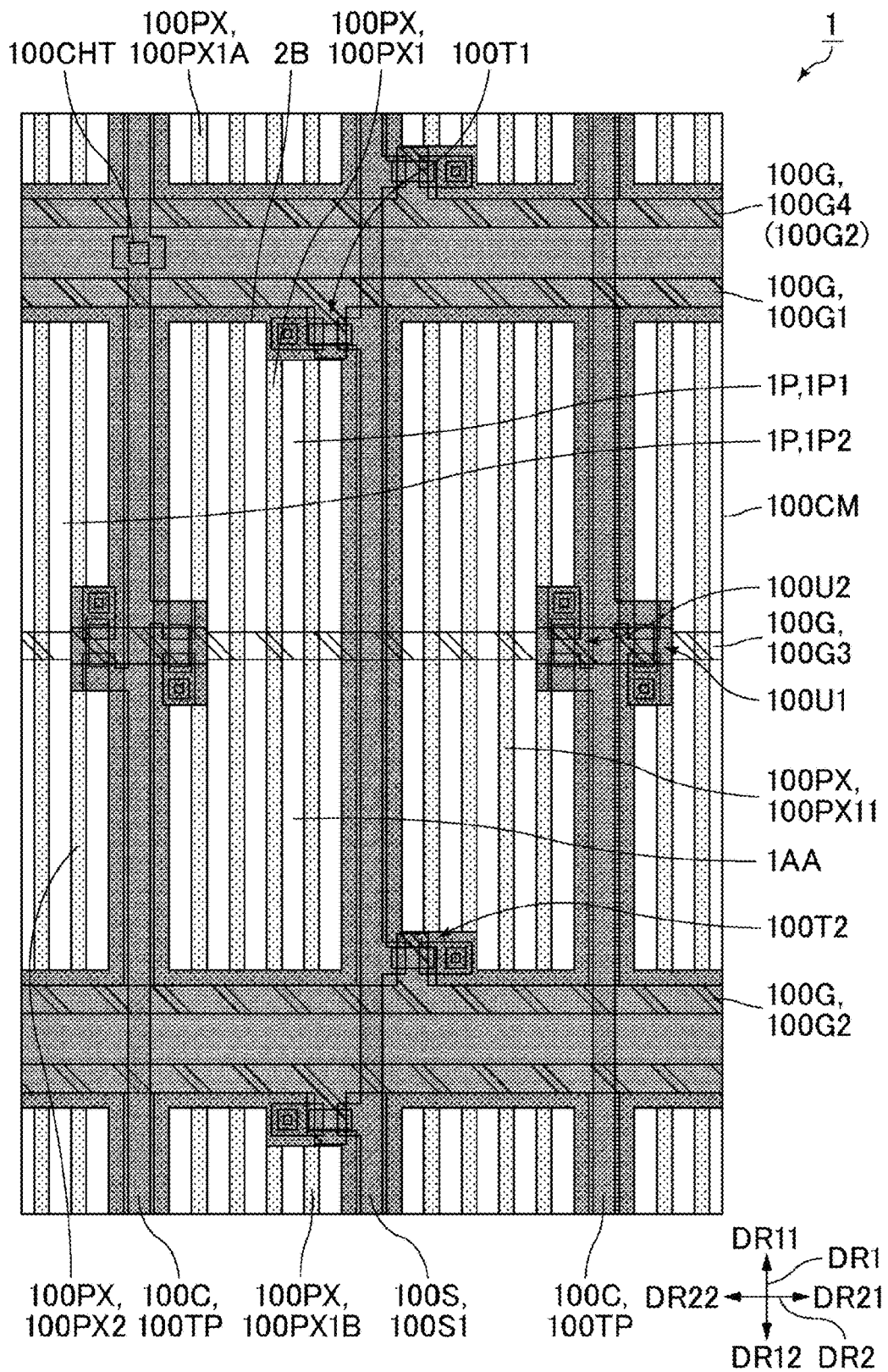
FIG. 15 is a schematic plan view of the display panel of the third embodiment.

FIG. 14 is an example of a schematic plan view illustrating the entire display panel of the third embodiment. FIG. 15 is a schematic plan view of the display panel of the third embodiment. As illustrated in FIGS. 14 and 15, the display panel 1 of the present embodiment includes a touch panel electrode 100TPX, which is an electrode in which the common electrode 100 CM is divided, and the common line 100C is connected to the touch panel electrode 100TPX and functions as a touch panel wiring line 100TP. Such aspect can achieve the display panel 1 with the built-in touch sensor.

More specifically, the display panel 1 of the present embodiment includes the plurality of touch panel electrodes 100TPX, and the plurality of touch panel electrodes 100TPX are provided in a tile shape (matrix) in the display region 1AA. Each of the common lines 100C is connected to any one of the plurality of touch panel electrodes 100TPX and functions as the touch panel wiring line 100TP. The common line 100C (touch panel wiring line 100TP) is connected to the source driver.

The touch panel electrode 100TPX is set to a pixel reference potential (common voltage) as a common electrode during a writing period in which a display signal (image signal) that is a signal for display is written in each pixel 1P, and functions as a touch panel electrode during a sensing period in which no display signal is written (gate scan is not performed). During the sensing period, a sensing signal is input from the source driver to the touch panel electrode 100TPX via the touch panel wiring line 100TP. Examples of the sensing signal include a touch signal that is a pulse signal applied to detect a change in electrostatic capacitance in each of the touch panel electrodes 100TPX.

As described above, the display panel 1 of the present embodiment is a display panel (full in-cell panel) with the built-in touch sensor. The touch panel electrode (also called a touch sensor electrode) is a rectangular electrode (touch detection electrode) of several millimeters square (2 mm to 5 mm), for example. The touch panel electrodes 100TPX are arrayed in a matrix in the display region 1AA. In the case of a liquid crystal display panel using a transverse electrical field such as the IPS system or the FFS system, the touch panel electrode 100TPX can have a function as the common electrode 100 CM (opposing to the pixel electrode 100PX). At this time, the pixel electrode 100PX on the touch panel electrode 100TPX (common electrode 100 CM) is preferably provided with a slit (e.g., several micrometers in width) for generating the transverse electrical field.

In the present embodiment, an example of a "self-capacitance type" has been described as the detection method of the capacitive touch sensor, but a similar effect can be obtained also in a "mutual-capacitance type". In the present embodiment, the touch panel wiring line 100TP plays the role of the common line 100C of the first embodiment and the second embodiment. Therefore, for example, a COM signal is input to the touch panel wiring line 100TP (common line 100C).

As illustrated in FIG. 15, the display panel 1 of the present embodiment includes a contact hole 100CHT to which the common line 100C functioning as the touch panel wiring line 100TP and the common electrode 100 CM functioning as the touch panel electrode 100TPX are connected between the first gate line 100G1 and the fourth gate line 100G4 arranged between the pixel electrodes adjacent in the longitudinal direction DR1 (e.g., the pixel electrode 100PX1 and the pixel electrode 100PX1A). That is, similarly to the second embodiment, the contact hole 100CHT in which the common electrode 100 CM (touch panel electrode 100TPX), which is a transparent electrode, and the common line 100C (touch panel wiring line 100TP) are connected is provided between the first gate line 100G1 and the fourth gate line 100G4. With such aspect, the common electrode 100 CM (touch panel electrode 100TPX) functions as a common electrode when a display image is displayed, and functions as a sensor electrode when a touch panel signal is detected.

The effects of the disclosure will be described below with reference to the examples and comparative examples, but the disclosure is not limited by these examples.

Example 1

The display panel of the present example corresponds to the display panel of the first embodiment. The display panel 1 of the present example includes: the plurality of pixels 1P arranged in a matrix in the longitudinal direction DR1 and the lateral direction DR2; a plurality of pixel electrodes 100PX provided respectively corresponding to the plurality of pixels 1P; a common electrode 100 CM that generates an electrical field between the common electrode 100 CM and each of the plurality of pixel electrodes 100PX; the first gate line 100G1, the second gate line 100G2, the third gate line 100G3, and the fourth gate line 100G4, all of which extend in the lateral direction DR2; and the first data line 100S1, the second data line 100S2, and the common line 100C, all of which extend in the longitudinal direction DR1. The plurality of pixels 1P include the first pixel 1P1 and the second pixel 1P2 adjacent to the first pixel 1P1 in the lateral direction DR2, and the plurality of pixel electrodes 100PX include the first pixel electrode 100PX1 corresponding to the first pixel 1P1 and the second pixel electrode 100PX2 corresponding to the second pixel 1P2. The first gate line 100G1 and the fourth gate line 100G4 are arranged on the one side DR11 of the first pixel electrode 100PX1 in the longitudinal direction DR1, and the second gate line 100G2 is arranged on the other side DR12 of the first pixel electrode 100PX1 in the longitudinal direction DR1. The third gate line 100G3 is arranged to overlap the first pixel electrode 100PX1 and the second pixel electrode 100PX2 between the first gate line 100G1 and the second gate line 100G2. The common line 100C is arranged between the first pixel electrode 100PX1 and the second pixel electrode 100PX2. The first data line 100S1 is arranged between the first pixel electrode 100PX1 and the pixel electrode 100PX11 adjacent on the side opposite to the second pixel electrode 100PX2 in the lateral direction DR2 with respect to the first pixel electrode 100PX1, and the second data line 100S2 is arranged between the second pixel electrode 100PX2 and the pixel electrode 100PX21 adjacent on the side opposite to the first pixel electrode 100PX1 in the lateral direction DR2 with respect to the second pixel electrode 100PX2. Furthermore, the first switching element 100U1 connected to the first pixel electrode 100PX1, the common line 100C, and the third gate line 100G3, and the second switching element 100U2 connected to the second pixel electrode 100PX2, the common line 100C, and the third gate line 100G3 are included. The display panel 1 of the present example can reduce the number of data lines and suppress an afterimage, and can sufficiently secure charging time of each pixel.

Example 2

The display panel of the present example corresponds to the display panel of the second embodiment. The display panel 1 of the present example includes the contact hole 100CH to which the common line 100C and the common electrode 100 CM are connected between the first gate line 100G1 and the fourth gate line 100G4 arranged between the pixel electrodes adjacent in the longitudinal direction DR1 (e.g., the pixel electrode 100PX1 and the pixel electrode 100PX1A). The display panel 1 of the present example can also reduce the number of data lines and suppress an afterimage, and can sufficiently secure charging time of each pixel. The display panel 1 of the present example further enables a signal to be input to the common line 100C to be a common electrode signal. The display panel 1 of the present example can suppress delay of the common electrode signal, and the display quality is improved. The display panel 1 of the present example can suppress a decrease in the aperture ratio.

Example 3

The display panel of the present example corresponds to the display panel of the third embodiment. The display panel 1 of the present example includes the touch panel electrode 100TPX, which is an electrode in which the common electrode 100 CM is divided, and the common line 100C is connected to the touch panel electrode 100TPX and functions as the touch panel wiring line 100TP. The display panel 1 of the present example can also reduce the number of data lines and suppress an afterimage, and can sufficiently secure charging time of each pixel. The display panel 1 of the present example can further cause the common line 100C to function as the touch panel wiring line 100TP, and can achieve a display panel with a built-in touch sensor.

Each of the aspects of the disclosure described above may be appropriately combined in a scope without departing from the gist of the disclosure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A display panel comprising:
a plurality of pixels arranged in a matrix in a longitudinal direction and a lateral direction;
a plurality of pixel electrodes provided respectively corresponding to the plurality of pixels;
a common electrode configured to generate an electrical field between the common electrode and each of the plurality of pixel electrodes;
a first gate line, a second gate line, a third gate line, and a fourth gate line, all of which extend in the lateral direction; and
a first data line, a second data line, and a common line, all of which extend in the longitudinal direction,
wherein the plurality of pixels include a first pixel and a second pixel adjacent to the first pixel in the lateral direction,
the plurality of pixel electrodes include a first pixel electrode corresponding to the first pixel and a second pixel electrode corresponding to the second pixel,
the first gate line and the fourth gate line are arranged on one side of the first pixel electrode in the longitudinal direction,
the second gate line is arranged on an other side of the first pixel electrode in the longitudinal direction,
the third gate line is arranged to overlap the first pixel electrode and the second pixel electrode between the first gate line and the second gate line,
the common line is arranged between the first pixel electrode and the second pixel electrode,
the first data line is arranged between the first pixel electrode and a pixel electrode, among the plurality of pixel electrodes, adjacent on a side opposite to the second pixel electrode with respect to the first pixel electrode in the lateral direction,
the second data line is arranged between the second pixel electrode and a pixel electrode, among the plurality of pixel electrodes, adjacent on a side opposite to the first pixel electrode with respect to the second pixel electrode in the lateral direction, and
the display panel further includes
a first switching element connected to the first pixel electrode, the common line, and the third gate line, and
a second switching element connected to the second pixel electrode, the common line, and the third gate line.

2. The display panel according to claim 1 further comprising:
a third switching element connected to the first pixel electrode, the first data line, and the first gate line; and
a fourth switching element connected to the second pixel electrode, the second data line, and the second gate line.

3. The display panel according to claim 2,
wherein an area of the first switching element in plan view and an area of the second switching element in plan view are
equal to or less than an area of the third switching element in plan view and an area of the fourth switching element in plan view, respectively.

4. The display panel according to claim 3,
wherein the area of the first switching element in plan view and the area of the second switching element in plan view are
smaller than the area of the third switching element in plan view and the area of the fourth switching element in plan view, respectively.

5. The display panel according to claim 2,
wherein a channel width of the first switching element and a channel width of the second switching element are
equal to or less than a channel width of the third switching element and a channel width of the fourth switching element, respectively.

6. The display panel according to claim 5,
wherein the channel width of the first switching element and the channel width of the second switching element are
smaller than the channel width of the third switching element and the channel width of the fourth switching element, respectively.

7. The display panel according to claim 1,
wherein the first gate line and the fourth gate line are arranged between the first pixel electrode and a pixel electrode, among the plurality of pixel electrodes, adjacent on the one side in the longitudinal direction of the first pixel electrode, and
the second gate line is arranged between the first pixel electrode and a pixel electrode, among the plurality of pixel electrodes, adjacent on the other side in the longitudinal direction of the first pixel electrode.

8. The display panel according to claim 1,
wherein at least one of the first pixel electrode and the common electrode includes a slit including a bent portion, and
the third gate line overlaps the bent portion in plan view.

9. The display panel according to claim 1,
wherein the common line is connected to a ground wiring line to which a ground signal is supplied.

10. The display panel according to claim 1,
wherein the common line is connected to the common electrode.

11. The display panel according to claim 1 further comprising
a touch panel electrode that is an electrode in which the common electrode is divided,
wherein the common line is connected to the touch panel electrode and functions as a touch panel wiring line.

12. The display panel according to claim 1 further comprising
a contact hole between the first gate line and the fourth gate line, the contact hole to which the common line and the common electrode are connected.

13. The display panel according to claim 1,
wherein assuming that a length of the pixel electrode in the longitudinal direction is D,
a distance between each of the third gate line, the first switching element, and the second switching element and an end portion of the pixel electrode in the longitudinal direction is equal to or greater than D/3 and equal to or less than 2D/3.

14. The display panel according to claim 1 further comprising:
a first gate driver configured to drive the first gate line, the second gate line, and the fourth gate line; and
a second gate driver configured to drive the third gate line,
wherein the first gate driver is arranged on one side in the lateral direction, and
the second gate driver is arranged on an other side in the lateral direction.

15. The display panel according to claim 1 further comprising:
a fifth gate line extending in the lateral direction and overlapping a pixel electrode, among the plurality of pixel electrodes, adjacent on the one side in the longitudinal direction of the first pixel electrode;
a first gate driver configured to drive the first gate line, the second gate line, and the fourth gate line; and
a second gate driver configured to drive the third gate line and the fifth gate line,
wherein a period in which a signal input from the second gate driver to the third gate line has a high potential and a period in which a signal input from the second gate driver to the fifth gate line has a high potential overlap each other in at least some period.

16. The display panel according to claim 15,
wherein the signal input to the third gate line and the signal input to the fifth gate line are a same signal.

17. The display panel according to claim 1 further comprising:
a fifth gate line extending in the lateral direction and overlapping a pixel electrode, among the plurality of pixel electrodes, adjacent on the one side in the longitudinal direction of the first pixel electrode;
a first gate driver configured to drive the first gate line, the second gate line, and the fourth gate line; and
a second gate driver configured to drive the third gate line and the fifth gate line,
wherein a period in which a signal input from the second gate driver to the third gate line has a high potential and a period in which a signal input from the second gate driver to the fifth gate line has a high potential do not overlap each other.

18. The display panel according to claim 1 further comprising:
a first gate driver configured to drive the first gate line, the second gate line, and the fourth gate line; and
a second gate driver configured to drive the third gate line,
wherein in a first period within one frame period, the first gate driver drives the first gate line, the second gate line, and the fourth gate line, and writes, to each of the plurality of pixels, an image signal having an area of equal to or greater than ½ of an area of each of the plurality of pixels, and
in a second period following the first period of the one frame period, the second gate driver drives the third gate line, and writes a ground signal or a common electrode signal to each of the plurality of pixels.

* * * * *